United States Patent
Okada

(10) Patent No.: US 7,843,173 B2
(45) Date of Patent: Nov. 30, 2010

(54) CHARGER AND METHOD OF CHARGING

(75) Inventor: Masami Okada, Fukushima (JP)

(73) Assignee: Sony Corporation, Tokyo (JP)

( * ) Notice: Subject to any disclaimer, the term of this patent is extended or adjusted under 35 U.S.C. 154(b) by 634 days.

(21) Appl. No.: 11/874,035

(22) Filed: Oct. 17, 2007

(65) Prior Publication Data

US 2008/0094038 A1    Apr. 24, 2008

(30) Foreign Application Priority Data

Oct. 23, 2006  (JP) ............................ P2006-287269
Sep. 28, 2007  (JP) ............................ P2007-253204

(51) Int. Cl.
   *H02J 7/06*   (2006.01)
   *H02J 7/24*   (2006.01)
(52) U.S. Cl. ........................ 320/163; 320/134; 324/429
(58) Field of Classification Search ................. 320/163; 324/429

See application file for complete search history.

(56) References Cited

U.S. PATENT DOCUMENTS

| | | | | |
|---|---|---|---|---|
| 4,678,984 | A * | 7/1987 | Henze | 323/285 |
| 5,408,170 | A | 4/1995 | Umetsu et al. | |
| 5,990,663 | A * | 11/1999 | Mukainakano | 320/134 |
| 6,242,890 | B1 * | 6/2001 | Sudo et al. | 320/128 |
| 6,424,158 | B2 * | 7/2002 | Klang | 324/433 |
| 6,700,383 | B2 * | 3/2004 | Kimura et al. | 324/429 |
| 6,873,135 | B2 * | 3/2005 | Nakatsuji | 320/132 |
| 7,408,325 | B2 * | 8/2008 | Yamamoto et al. | 320/133 |
| 7,528,575 | B2 * | 5/2009 | Murakami et al. | 320/132 |
| 7,619,386 | B2 * | 11/2009 | Sasaki et al. | 320/106 |
| 2002/0109486 | A1 * | 8/2002 | Tange et al. | 320/162 |
| 2007/0001646 | A1 * | 1/2007 | Kojima | 320/128 |
| 2007/0013344 | A1 * | 1/2007 | Aradachi et al. | 320/132 |

FOREIGN PATENT DOCUMENTS

JP    6-014473    1/1994

* cited by examiner

*Primary Examiner*—Edward Tso
*Assistant Examiner*—Arun Williams
(74) *Attorney, Agent, or Firm*—K&L Gates LLP

(57) ABSTRACT

A charger includes input terminals whereto positive and negative voltages from a power source unit are applied, output terminals generating an output charging a secondary battery, upon being applied with the voltage from the input terminals via positive and negative power source lines, a first field effect type transistor and a second field effect type transistor having a region between a drain and a source inserted in at least one of the positive and negative power source lines, and having a first parasitic diode with a polarity reverse against charge current, and a second parasitic diode with a polarity forward direction with charge current respectively, a first detection circuit and a second detection circuit having series connections of a plurality of resistors inserted between the positive and negative power source lines, the first circuit is between the input terminals and the first transistor, and the second circuit is between the first transistor and the second transistor, and a charge control unit supplied with the first and second detection voltages, and generates ON/OFF control signals for the gates of the first and second transistors.

16 Claims, 11 Drawing Sheets

CHARGER AND METHOD OF CHARGING

CROSS REFERENCES TO RELATED APPLICATIONS

The present application claims priority to Japanese Patent Application Nos. P2006-287269 filed in the Japan Patent Office on Oct. 23, 2006; and P2007-253204 filed in the Japan Patent Office on Sep. 28, 2007, the entire contents of which is being incorporated herein by reference.

BACKGROUND

The present application relates to a charger for secondary batteries, and a method of charging.

There has been known a method of charging secondary batteries based on combination of constant-current charging and constant-voltage charging. FIG. 1 explains the method of charging, in which the abscissa axis expresses charge current (A), and the ordinate axis expresses battery voltage (V). Region (a-b) corresponds to the range of constant-voltage charging, and region (c-d) corresponds to the range of constant-current charging. A power source unit for charging performs constant-voltage regulation in the region (a-b), and performs constant-current regulation in the region (c-d).

For example, in the region where a battery voltage Vb is 4.1 V or below, constant-current charging is performed by a charge current Ib being 500 mA. When the battery voltage exceeds 4.1 V, the power source unit performs constant-voltage regulation to gradually lower the charge current Ib. Battery voltage Vb rises towards an output voltage Vo of the power source unit of 4.2 V, and the charging comes to the end.

An example of related art charger is shown in FIG. 2. The configuration shown in FIG. 2 is aimed at explaining both of current detection and ΔV detection, as methods of detecting the state of charging, and provision of either one of which will be sufficient. A power source unit 1 is connected to a commercial power source with an AC connector CN11 in between, and outputs an output voltage Vo of, for example, 4.2 V to output terminals 1a and 1b. Output voltage of the power source unit 1 is supplied to a secondary battery 2 with a detection/charging unit 3 in between, and thereby the secondary battery 2 is charged.

The detection/charging unit 3 is controlled by a charge control unit 4. The charger includes the detection/charging unit 3 and the charge control unit 4. The charge control unit 4 controls charging and discharging of the secondary battery 2, and is typically configured as an IC circuit containing a microcomputer. Although not shown in the drawing, positive output voltage of the power source unit 1 is supplied to a regulator and is adjusted therein to a predetermined voltage, and the predetermined voltage is supplied to the charge control unit 4 as a source voltage. Between the positive output terminal 1a of the power source unit 1 and the positive terminal of the secondary battery 2, a switching element S11 and a diode D11 having a forward polarity with respect to charge current Ib are connected in series. The switching element S11 is controlled by the charge control unit 4. The charge current Ib is not supplied, when the switching element S11 is switched OFF.

Between the negative output terminal 1b of the power source unit 1 and the negative terminal of the secondary battery 2, a resistor Rx for current detection is connected in series. A series connection of resistors R11 and R12 is connected in parallel with the power source unit 1 between the output terminals 1a and 1b thereof. A series connection of resistors R13 and R14 is connected, at the cathode side of the diode D11, in parallel with the secondary battery 2 between the positive and negative terminals thereof.

Voltage Vx extracted from the middle point of connection between the resistors R11 and R12, and voltage Vy extracted from the middle point of connection between the resistors R13 and R14 are supplied to the charge control unit 4. On both sides of the resistor Rx, voltage Ex corresponding to the charge current Ib is generated. The voltage Ex is supplied to an operation amplifier OP11, and compared with detection voltage Ei generated by a voltage source IC1. Output voltage of the operation amplifier OP11 is supplied to the charge control unit 4.

The current detection system uses a factor that the charge current Ib decreases when the constant-voltage is regulated at the final stage of charging. In the system, the charge current Ib is converted to voltage Ex by the resistor Rx, and the voltage Ex is compared with the detection voltage Ei to determine the state of charging. The system is effective for devices having relatively small charge current Ib, because the resistor Rx causes a loss ascribable to the charge current Ib. The ΔV detection system measures output voltage Vo of the power source unit 1 and battery voltage Vb of the secondary battery 2 connected to the detection/charging unit 3, and determines the state of charging based on difference ΔV therebetween. The ΔV system is effective for devices having relatively large charge current Ib, because the state of charging is determined by voltage measurement. An exemplary charger based on the ΔV system is described in Japanese Patent Application Publication No. JP H6-014473 (Patent Document 1).

Accuracy of the charger configured as shown in FIG. 2 will be explained. First, accuracy of the current detection system will be explained.

Assuming a detection resistor as Rx, detection current as Ix, and offset voltage presented between the positive and negative output terminals of the operation amplifier as Vio, the detection voltage Ex is $$Ex = Ix \times Rx \qquad (1)$$

When the detection voltage Ei equals to Ex, measurement error Q ascribable to the offset voltage is $$Q = Vio \div Ei \qquad (2)$$

The detection accuracy may be improved by using high precision components respectively for the operation amplifier OP11, the voltage source IC1 and the detection resistor Rx, but costs for the components will increase. The detection accuracy may be improved also by raising the detection voltage Ei, but due to loss P of the resistor Rx expressed as $$P = Ib \times Ib \times Rx \qquad (3)$$

the efficiency will degrade, and a high-power-type products will be necessary, thereby the cost increases, and the downsizing of components becomes difficult.

The detection accuracy in the ΔV system will be explained next, referring to FIG. 1. The charge control unit 4 generally includes an one-chip microcomputer or the like, and an operation voltage of the unit is lower than the output voltage Vo of the power source unit 1, therefore the detection voltage input into the unit must be lowered by resistive division.

The detection voltage Vx extracted from the middle point between the resistors R11 and R12 is written.

$$Vx = Vo \times R12 \div (R11 + R12) \qquad (4)$$

Similarly, the voltage Vy extracted from the middle point between the resistors R13 and R14 is written $$Vy = Vb \times R14 \div (R13 + R14) \qquad (5).$$

If defined as $$R11 \div R12 = A$$

then the equation (4) gives $$Vx = Vo \div (A+1) \qquad (6)$$

By expressing accuracy of the resistor R11 as G, and accuracy of the resistor R12 as H, a condition Bh making Vx large under the same Vo is written $$Bh = (1-G) \div (1+H) \qquad (7)$$

and a condition Bs making Vx small is written $$Bs = (1+G) \div (1-H) \qquad (8)$$

By expressing Vx taking the resistor errors into consideration as Vxh and Vxs, respectively, they are expressed $$Vxh = Vo \div (A \times Bh + 1) \qquad (9)$$

$$Vxs = Vo \div (A \times Bs + 1) \qquad (10)$$

As a consequence, detection error Q affected by the accuracy of the resistance value of resistive division is written $$Qh = (Vxh - Vx) \div Vx \qquad (11)$$

$$Qs = (Vxs - Vx) \div Vx \qquad (12)$$

in which $Qh \approx Qs$ holds if G=H.

Assuming now (R11=R13, R12=R14: condition 1), Vy will have an error similarly to Vx. Given, for example, as Vo=10 V, R11 to R14=10 kΩ±0.5%, Vx and Vy will respectively have an error of ±0.5%. Resistors having an accuracy of ±0.5% are understood as high-precision components. This means that approximately 1% of Vo is undetectable due to resistivity errors, when ΔV(=Vo−Vb) is detected. If Vo=10 V, 100 mV is undetectable.

In general, detection of the charge state must be sensible to a ΔV of several millivolts to several tens millivolts. In other words, an undetectable voltage of 100 mV raises a need of some countermeasure. The accuracy may be improved by setting the resistor R14 a variable resistor and adjusting it, but adjustment error will remain, thereby causing increase in the cost and inhibiting the downsizing. Another issue is that the secondary battery 2 after completion of charging is discharged due to the resistors R13, R14 connected thereto, thereby causing lowering in the battery capacity, and degradation of the battery induced by re-charging.

Still another issue is that, when operation of the power source unit 1 is stopped while the secondary battery 2 is connected thereto, the battery voltage is applied through the resistor R13 to the charge control unit 4 to cause a state of reverse voltage, even though the operation source voltage to the charge control unit 4 is 0 V, thus thereby raising a need of protection for IC and so forth composing the charge control unit 4. On the other hand, in order to prevent the charge control unit 4 from being applied with reverse voltage when the output voltage Vo of the power source unit 1 is brought into an over-voltage state, values of Vx must be equal to or smaller than the operation source voltage of the charge control unit 4. In addition, a small quotient (Vx÷Vo), or a large ratio of Vo to Vx, will degrade the detection accuracy, because the amount of change of Vx relative to the amount of change of Vo becomes small.

A description of Patent Document 1 in FIG. 1, FIG. 7 and FIG. 13 is provided below.

In FIG. 1, charge output voltage Vo1 is measured during charging at a position nearer to the secondary battery 9 side than the switch unit 8. This means that result of measurement is modified, because measurement of Vo1 contains voltage drop ascribable to the charge current during the measurement and impedance of the switch unit 8.

In FIG. 7, the charge current is cut off at certain intervals, and when voltage difference between the output voltage VA1 at the power source side and voltage VA2 at the battery side in the cut off state is measured, voltages at a plurality of points are measured with a single detection circuit by selecting connection points by a switch. This may successfully exclude measurement errors among the detection circuits possibly occur when the detection circuits are provided to the individual points of measurement, but increase the cost caused by a component for the switching. This problem is similar as illustrated in FIG. 13 of Patent Document 1.

SUMMARY

Accordingly, it is desirable to provide a charger and a method of charging, capable of detecting the amount of charging in a highly precise manner based on the ΔV detection, while being less affected by accuracy of the resistors and changes in the ambient environment.

According to an embodiment, there is provided a charger which includes:

input terminals allowing positive and negative voltages from a power source unit applied therethrough;

output terminals generating an output charging a secondary battery, upon being applied with the voltage through positive and negative power source lines from the input terminals;

a first field effect type transistor having the region between the drain and the source inserted in at least one of the positive and negative power source lines, and including a first parasitic diode having the reverse polarity with respect to charge current;

a second field effect type transistor having the region between the drain and the source inserted in at least one of the positive and negative power source lines, and including a second parasitic diode having a forward polarity with respect to charge current;

a first detection circuit having a series connection of a plurality of resistors inserted between the positive and negative power source lines, between one of the input terminals and the first field effect type transistor, allowing extraction of a first detection voltage from divisional point(s) of the resistors;

a second detection circuit having a series connection of a plurality of resistors inserted between the positive and negative power source lines, between the first field effect transistor and the second field effect transistor, allowing extraction of a second detection voltage from divisional point(s) of the resistors; and a charge control unit supplied with the first and second detection voltages, generating ON/OFF control signals for the gates of the first and second field effect transistors.

The charge control unit in the charger calculates a first difference voltage between the first and second detection voltages, while turning the first field effect type transistor OFF and turning the second field effect type transistor ON, and judges whether the first difference voltage has a value not turning the second parasitic diode ON;

if the first difference voltage is judged as having a value capable of turning the second parasitic diode ON, a charging operation is performed by turning the first and second field effect transistors ON;

whereas, if the first difference voltage is judged as having a value not turning the second parasitic diode ON, the voltage same as that of the first and second detection circuits is applied and a second difference voltage is calculated by turning the first field effect type transistor ON and the second field effect type transistor OFF; and the charge control unit of the charger compares a third difference voltage corrected by thus-detected second difference voltage with a reference voltage, to detect the end-of-charge state.

According to an embodiment, there is also provided a charger which includes:

input terminals allowing positive and negative voltages from a power source unit applied therethrough;

output terminals generating an output charging a secondary battery, upon being applied with the voltage through positive and negative power source lines from the input terminals;

a first field effect type transistor having the region between the drain and the source thereof inserted in at least one of the positive and negative power source lines, and including a first parasitic diode with the reverse polarity with respect to charge current;

a second field effect type transistor having the region between the drain and the source inserted in at least one of the positive and negative power source lines, and including a second parasitic diode with a forward polarity with respect to charge current;

a first detection circuit having a series connection of a plurality of resistors inserted between the positive and negative power source lines, between one of the input terminals and the first field effect transistor, and allowing extraction of a first detection voltage from divisional point(s) of the resistors;

a second detection circuit having a series connection of a plurality of resistors inserted between the positive and negative power source lines, between the first field effect type transistor and the second field effect type transistor, and allowing extraction of a second detection voltage from divisional point(s) of the resistors; and a charge control unit supplied with the first and second detection voltages, and generates ON/OFF control signals for the gates of the first and second field effect type transistors.

The charge control unit of the charger calculates a first difference voltage between the first and second detection voltages, while turning the first field effect type transistor OFF and turning the second field effect type transistor ON, and judges whether the first difference voltage has a value not turning the second parasitic diode ON;

if the first difference voltage is judged as having a value turning the second parasitic diode ON, the first and second field effect type transistors are turned ON, and a charging operation is performed;

whereas, if the first difference voltage is judged as having a value not turning the second parasitic diode ON, calculation is performed to a corrected reference value in which error in the reference value for judging whether the end-of-charge state or not is corrected; and the charge control unit of the charger compares the difference voltage between the first and second detection voltages with the corrected reference voltage, to detect the end-of-charge state.

According to an embodiment, there is also provided a method of charging which includes:

a step of detecting first detection voltage by applying a no-load voltage from a power source unit to a first detection circuit while turning a first field effect type transistor OFF to cut off charge current, and detecting a second detection voltage by applying the open voltage of a secondary battery on the second detection circuit while turning a second field effect type transistor ON, a step of calculating a first difference voltage between the first and second detection voltages, and judging whether the first difference voltage has a value not turning the second parasitic diode of the second field effect type transistor ON;

a step of turning the first and second field effect type transistors ON and performing a charging operation, if the first difference voltage is judged as having a value capable of turning the second parasitic diode ON;

a step of turning the first field effect transistor ON and turning the second field effect transistor OFF, and applying the voltage same with that of the first and second detection circuits to calculate a second difference voltage if the first difference voltage is judged as having a value not turning the second parasitic diode ON; and a step of comparing a third difference voltage corrected by thus-detected second difference voltage with a reference voltage, to detect the end-of-charge state.

According to an embodiment, there is still also provided a method of charging which includes:

a step of detecting first detection voltage by applying a no-load voltage from a power source unit on a first detection circuit while turning a first field effect type transistor OFF and cutting off charge current, and detecting a second detection voltage by applying the open voltage of a secondary battery on the second detection circuit while turning a second field effect type transistor ON, a step of calculating a first difference voltage between the first and second detection voltages, and judging whether the first difference voltage has a value not turning the second parasitic diode of the second field effect type transistor ON;

a step of turning the first and second field effect type transistors ON to perform a charging operation, if the first difference voltage is judged as having a value capable of turning the second parasitic diode ON;

a step of performing calculation on a corrected reference value in which error in the reference value for judging whether the end-of-charge state is achieved or not is corrected, if the first difference voltage is judged as having a value not turning the second parasitic diode ON; and a step of comparing the difference voltage between the first and second detection voltages with the corrected reference voltage, to detect the end-of-charge state.

According to an embodiment, there is provided a charger which includes:

input terminals allowing positive and negative voltages from a power source unit applied;

output terminals to generate an output charging a secondary battery, upon being applied with the voltage via positive and negative power source lines from the input terminals;

a first field effect type transistor having the region between a drain and a source inserted in at least one of the positive and negative power source lines, and including a first parasitic diode having the reverse polarity with respect to charge current;

a second field effect type transistor having the region between a drain and a source inserted in at least one of the positive and negative power source lines, and including a second parasitic diode having a forward polarity with respect to charge current;

a first detection circuit including a plurality of series-connected resistors inserted between the positive and negative power source lines, between one of the input terminals and the first field effect type transistor, allowing extraction of a first detection voltage from a divisional point of the resistors;

a second detection circuit including a plurality of series-connected resistors inserted between the positive and negative power source lines, between the first field effect transistor and the second field effect transistor, allowing extraction of a second detection voltage from a divisional point of the resistors; and a charge control unit which is supplied with the first and second detection voltages, and generates ON/OFF control signals for the gates of the first and second field effect transistors.

The charge control unit judge whether the charge current flows while turning ON the first field effect type transistor and turning OFF the second field effect type transistor, and if the charge current is judged as flowing, charge operation is performed by turning ON both of the first field effect type transistor and the second field effect type transistor;

if the charge current is judged as not flowing, a second difference voltage is calculated while the voltage same as that of the first and second detection circuits is applied via the ON state first field effect type transistor; and a third difference voltage corrected by thus-detected second difference voltage is compared with a reference voltage to detect the end-of-charge state.

According to an embodiment, there is also provided a charger which includes:

input terminals allowing positive and negative voltages from a power source unit applied;

output terminals to generate an output for charging a secondary battery, upon being applied with the voltage through positive and negative power source lines from the input terminals;

a first field effect type transistor having the region between the drain and the source thereof inserted in at least one of the positive and negative power source lines, and including a first parasitic diode of the reverse polarity with respect to charge current;

a second field effect type transistor having the region between the drain and the source inserted in at least one of the positive and negative power source lines, and including a second parasitic diode of a forward polarity with respect to charge current;

a first detection circuit including a plurality of series-connected resistors inserted between the positive and negative power source lines, between an input terminal and the first field effect transistor, and allowing extraction of a first detection voltage from a divisional point of the resistors;

a second detection circuit including a plurality of series-connected resistors inserted between the positive and negative power source lines, between the first field effect type transistor and the second field effect transistor, and allowing extraction of a second detection voltage from a divisional point of the resistors; and a charge control unit which is supplied with the first and second detection voltages, and generates ON/OFF control signals for the gates of the first and second field effect type transistors.

The charge control unit judges whether the charge current flows while turning ON the first field effect type transistor and turning OFF the second field effect type transistor;

if the charge current is judged as flowing, the charge operation is performed by turning ON both of the first field effect type transistor and the second field effect type transistor;

if the charge current is judged as not flowing, a corrected reference value which is corrected error value of a reference value for judging whether the end-of-charge state or not is calculated; and the difference voltage between the first and second detection voltages is compared with the corrected reference voltage to detect the end-of-charge state.

According to an embodiment, there is also provided a method of charging the charger in which a secondary battery is charged by arranging the first field effect type transistor and the second field effect type transistor in series, the voltage at input side of the first field effect type transistor is detected by the first detection circuit having a plurality of resistors, and the voltage at a connection point between the first field effect type transistor and the second field effect type transistor is detected by the second detection circuit having a plurality of resistors.

The method of charging includes:

judging whether the charge current flows the second battery via parasitic diode of the second field effect type transistor while turning ON the first field effect type transistor and turning OFF the second field effect type transistor;

performing charging operation to the secondary battery while turning ON both of the first field effect type transistor and the second field effect type transistor, if the charge current is judged as flowing;

calculating the difference voltage via the ON state first field effect type transistor when the charge current is judged as not flowing while the voltage is applied to the first detection circuit and the second detection circuit is applied; and detecting end of the charge state by comparing a difference voltage corrected by the difference voltage with the reference voltage.

According to an embodiment, there is also provided a method of charging the charger in which a secondary battery is charged by arranging the first field effect type transistor and the second field effect type transistor in series, the voltage at input side of the first field effect type transistor is detected by the first detection circuit having a plurality of resistors, and the voltage at a connection point between the first field effect type transistor and the second field effect type transistor is detected by the second detection circuit having a plurality of resistors.

The method of charging includes:

judging whether the charge current flows to the second battery via parasitic diode of the second field effect type transistor while turning ON the first field effect type transistor and turning OFF the second field effect type transistor;

performing charging operation to the secondary battery when the charge current is judged as flowing while turning ON both of the first field effect type transistor and the second field effect type transistor;

calculating the corrected reference value, which is a corrected error value of a reference values for judging whether the end of the charge state or not when the charge current is judge as not flowing; and detecting the end of the charge state by comparing the difference voltage of detection voltage between the first detection circuit and the second detection circuit with the corrected reference voltage.

Additional features and advantages are described herein, and will be apparent from, the following Detailed Description and the figures.

DETAILED DESCRIPTION

Figure 1:
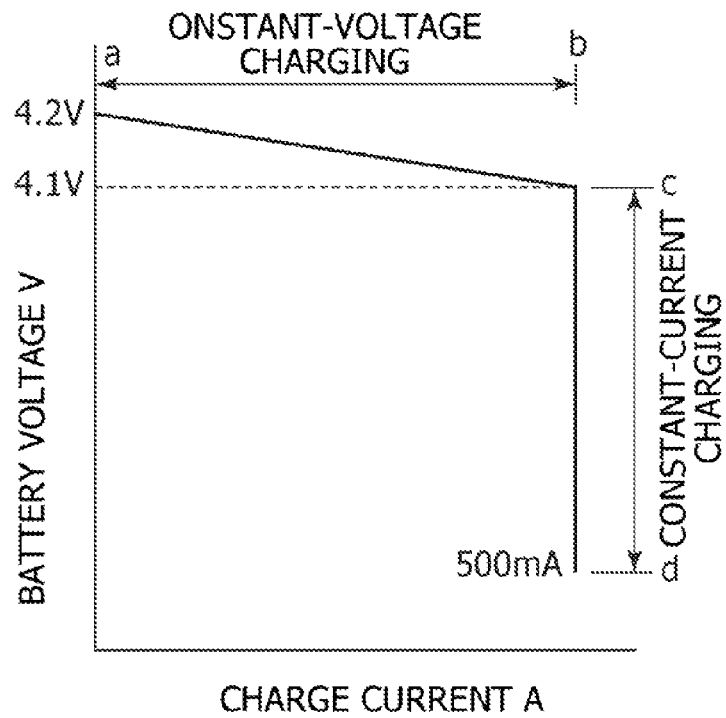
FIG. 1 is a schematic diagram explaining a method of charging.
Figure 2:
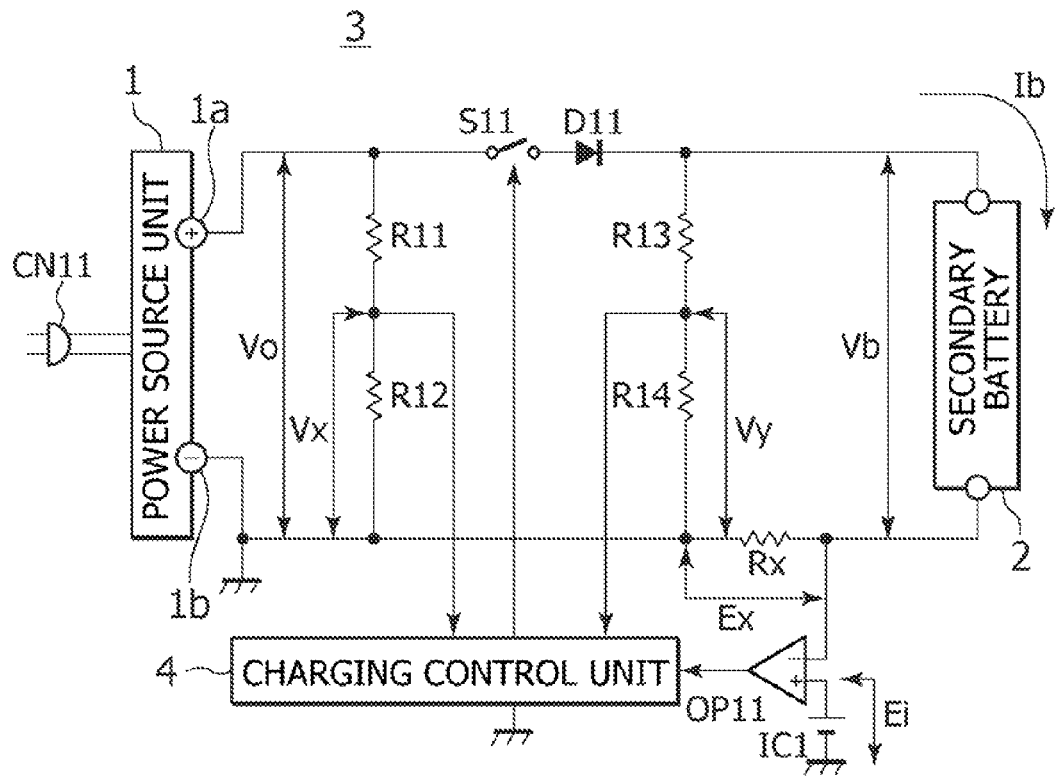
FIG. 2 is a connection diagram of an exemplary related art charger.
Figure 3:
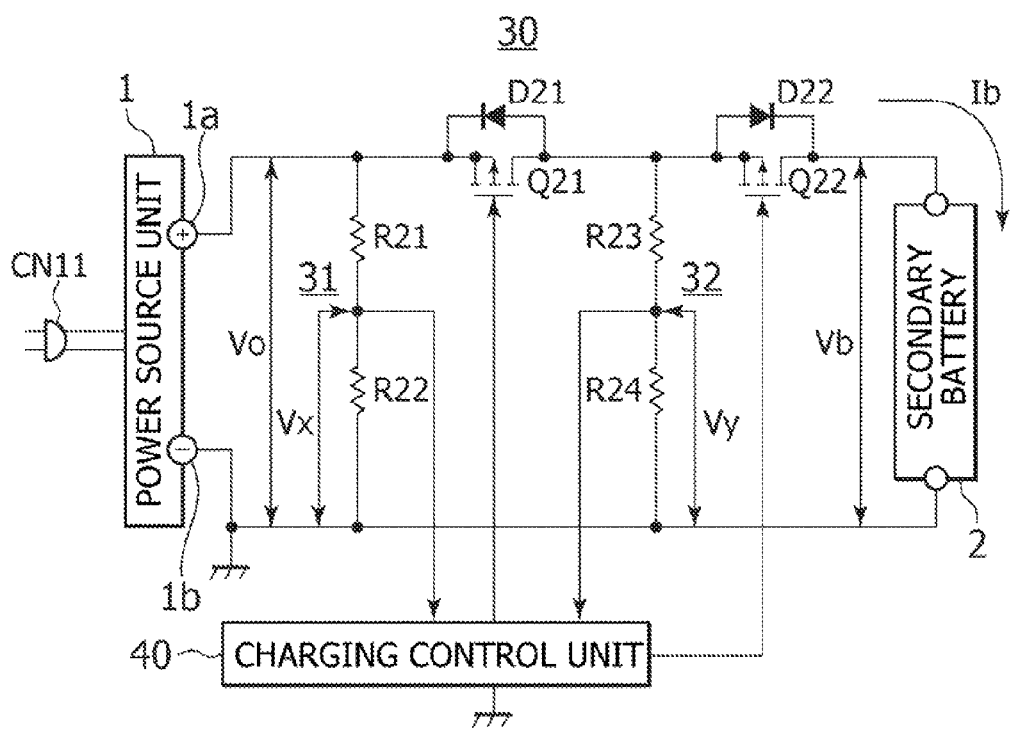
FIG. 3 is a connection diagram showing one embodiment.

A charger for performing charging based on combination of constant-current charging and constant-voltage charging, and the ΔV detection system is adopted as a method of detecting state of charging according to an embodiment as illustrated in FIG. 3. A power source unit 1 is connected through an AC connector CN11 to a commercial power source, and outputs an output voltage Vo to output terminals 1a and 1b, by AC-DC conversion. The output voltage of the power source unit 1 is supplied through a detection/charging unit 30 to a secondary battery (lithium ion battery, for example) 2, to charge the secondary battery 2. The output voltage Vo is a voltage observed when the battery is not connected thereto (occasionally referred to as "no-load voltage", hereinafter), and is typically set to, for example, 4.2 V which is a full-charged voltage of the secondary battery 2. The detection/charging unit 30 is controlled by a charge control unit 40. The charger includes the detection/charging unit 30 and the charge control unit 40.

In the positive power source line connecting the positive output terminal 1a of the power source unit 1 and the positive electrode of the secondary battery 2, P-channel type field effect transistors (abbreviated as FETs, hereinafter) Q21 and Q22 as switching elements are inserted in series. The FETs Q21 and Q22 have parasitic diodes D21 and D22, respectively, between the sources and drains thereof. The parasitic diode D21 has the reverse polarity with respect to the charge current Ib, and the forward polarity with respect to the discharge current, whereas the parasitic diode D22 has the forward polarity with respect to the charge current Ib, and the reverse polarity with respect to the discharge current.

The FET Q21 is a switching element for charge control, and the FET Q22 is a switching element for discharge control. A charge control signal is supplied from the charge control unit 40 to the gate of the FET Q21, and a discharge control signal is supplied from the charge control unit 40 to the gate of the FET Q22. The FETs Q21 and Q22 are of P-channel type, and therefore turn ON when a gate potential is lower by a predetermined values or more than the source potential.

The charge control unit 40 is typically configured as an IC circuit containing a microcomputer. Although not shown in the drawing, for example a positive output voltage of the power source unit 1 is supplied to a regulator, converted by the regulator into a predetermined operation source voltage (generally lower than the output voltage Vo of the power source unit 1), and the resultant operation source voltage is supplied to the charge control unit 40. The charge control unit 40 controls charging and discharging of the secondary battery 2, by controlling ON/OFF of the FETs Q21 and Q22. As one function of the charge control unit 40, a protective function protecting the secondary battery 2 from over-charging, over-discharging, or over-current.

The protective operation will be explained. Upon detection of over-charging by the charge control unit 40, the charge control signal turning the FET Q21 OFF is supplied to the gate of the FET Q21. The FET Q22 is left turned ON. As a consequence, the charge current Ib from the power source unit 1 is cut off, whereas the discharge current is allowed to flow through the FET Q22 and the parasitic diode D21. By virtue of this protective operation, the state of over-charging typically due to failure of the power source unit 1 is avoidable.

Alternatively, the secondary battery 2 may run into failure if it is connected with a load in place of the power source unit 1, and is brought into the state of over-discharging. The charge control unit 40 detects that the battery voltage becomes equal to or fell down below a predetermined voltage value (2.7 V, for example), turns the FET Q22 OFF using a discharge control signal, to cut off the discharge current. While the FET Q21 is left turned ON, the charge current Ib may flow. Further when the space circuit between positive and negative terminals of the battery 2 are shortened, a large current flowing therethrough may cause abnormal heating. When the discharge current of not smaller than a predetermined value flows, the charge control unit 40 turns the FET Q22 for discharge control OFF, to cut off the discharge current. Further, by turning the FET Q22 OFF, the current is prevented from flowing from the secondary battery 2 to the power source unit 1.

These protective functions are same as those owned by related art battery packs. In one embodiment, the charge control unit 40 measures the no-load voltage Vo of the power source unit 1 and the open-circuit voltage Vb of the secondary battery 2 respectively, and the state of charging is judged based on difference voltage ΔV (=Vo−Vb) between the both. The state of charging means amount of charging relative to the charge capacity of the secondary battery 2 connected to the detection/charging unit 30.

Between the point positioned in the middle of the positive output terminal 1a of the power source unit 1 and the FET Q21 (source), and the negative side power source line, a series connection of resistors R21 and R22 is inserted. The series connection of the resistors R21 and R22 forms a first detection circuit 31. Between the point positioned in the middle of the FET Q21 (drain) and the FET Q22 (source), and the negative side power source line, a series connection of resistors R23 and R24 is inserted. The series connection of the resistors R23 and R24 forms a second detection circuit 32. Voltage Vx extracted from the middle point of connection between the resistors R21 and R22, and voltage Vy extracted from the middle point of connection between the resistors R23 and R24 are supplied to the charge control unit 40.

In the above-described embodiment, flow of the charge current Ib is stopped by turning the FET Q21 OFF, and the no-load voltage Vo set to the full-charge voltage is applied to the detection circuit 31. By turning the FET Q22 ON, the detection circuit 32 is applied with the open voltage Vb of the secondary battery 2. These no-load voltage Vo and the open voltage Vb are measured indirectly based on Vx and Vy, respectively, and thus the voltage difference ΔV may be obtained. Because a relation of ΔV=(amount of charging) generally held, the amount of charging is estimated from the voltage difference ΔV, and operations such as stop of charging or display of charging and so forth are controlled based on ΔV.

Now, the voltage Vx detected by the detection circuit 31, and the voltage Vy detected by the detection circuit 32 contain errors depending on accuracy of the resistors R21, R22, R23, and R24. For example, even if a constant is set as R21=R22=R23=R24, and even if the same potential is applied to the detection circuit 31 and the detection circuit 32, an error occurs between Vx and Vy due to variation in resistance values in the individual resistors. In this case, even if high precision products are used for all of the resistors to suppress the variation in resistance values to 0.5%, ΔV will cause an error of ±1.0%.

Figure 4:
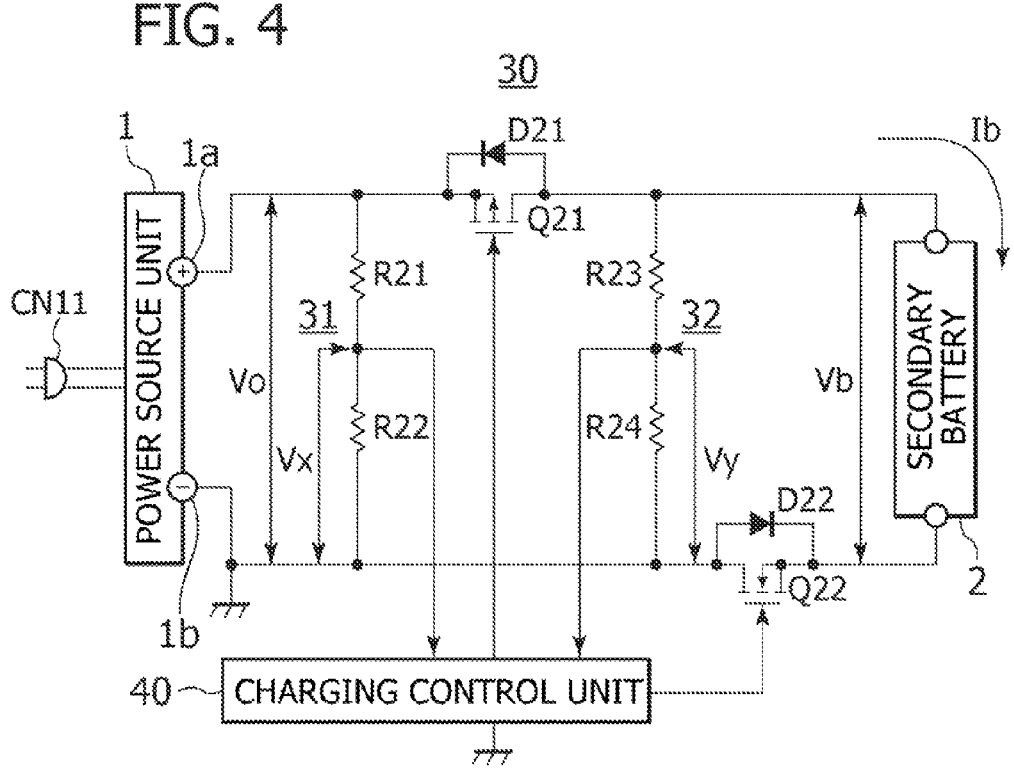
FIG. 4 is a connection diagram showing a partially modified example according to an embodiment.

As shown in FIG. 4, it is also allowable to connect the FET Q21 to the positive side power source line, and the FET Q22 to the negative side power source line. The source of the FET Q22 is connected to the negative electrode of the secondary battery 2, and the drain of FET Q22 is connected to the negative output terminal 1b of the power source unit 1. The parasitic diode D22 has the reverse polarity against the discharge current. For the FET Q22, an N-channel type transistor which turns ON at a gate voltage equal to or larger than a predetermined value is used. It is still also possible to insert both of the FETs Q21 and Q22 to the negative side power source line.

The charger according to one embodiment operates constant-current charging under a voltage Vc set not higher than the no-load voltage, and operates constant-voltage charging under the no-load voltage Vo. For example, in the battery voltage region of Vb=4.1 V or below, the constant-current charging is proceeded at Ib=500 mA. When the battery voltage exceeds 4.1 V, the power source unit 1 performs constant-voltage control operation, to gradually reduce the charge current Ib. The battery voltage Vb rises towards the output voltage Vo=4.2 V of the power source unit 1, then the charging comes to the end. As one example, the end-of-charge state is detected upon detection of ΔV=40 mV. When the charge state is detected, the charging may immediately stopped, or charging may be terminated when predetermined time has elapsed after the display of charging is altered.

Now, Vo=4.2 V, and Vb=4.16 V are given. Assuming R21=R22=R23=R24, ΔV=40 mV means that difference between Vx and Vy equals to 20 mV, and Vx=2.1 V, so it is expected to detect Vy=2.08 V. However, the detection accuracy degrades due to variation in product quality of the resistors R21 to R24. According to an embodiment aimed at improving the detection accuracy, an error ascribable to the resistor accuracy which resides between the detection circuits 31 and 32 is measured, and the set value or reference value of the ΔV detection is re-calculated to correct the error.

Operations in the above-described embodiment will be explained by referring to the flow chart shown in FIG. 5. Control operations shown in the flow chart are executed by a microcomputer in the charge control unit 40. Prior to the charging, three appropriate reference values ΔVp, ΔVq, Vys are stored in a memory of the microcomputer of the charge control unit 40. These reference values are typically set when the values of the resistors R21 to R24 are determined, and are typically stored in the memory of the charge control unit 40. The reference values ΔVp, ΔVq are compared with difference voltage ΔVxy between the measured Vx and Vy to judge the state of charging.

ΔVp herein is a reference value used for judging whether the correction operation described later should be carried out or not, and ΔVq is a reference value used for judging whether the charging should be terminated or not. ΔVp is set to make difference Vo−Vb, corresponding to ΔVp, not larger than the forward voltage Vf of the parasitic diode D22 of the FET Q22. ΔVp needs to be set with a certain degree of margin, because some error may be caused between the detection circuit 31 and the detection circuit 32 as described in the above. However, a relation of ΔVp (0.3 V, for example)>>ΔVq (40 mV) generally holds, so ΔVp does not affect the ΔVq detection.

(Vo−Vb=ΔV) indicates the end-of-charge state, where ΔVxy(=Vx−Vy) in this state is assumed as ΔVq. For example, assuming the center values (also referred to as nominal values) of the resistor R23, R24 respectively as R23', R24', ΔVq is expressed as follows:

$$\Delta Vq = \Delta V \times R24' \div (R23' + R24') \tag{13}$$

ΔVq is a value determined by characteristics and so forth of a battery to be adopted, typically ranging from several millivolts to several tens millivolts.

Assuming the center values of the resistors R23 and R24 as R23' and R24', respectively, and a rated value of the no-load voltage Vo as Vo', Vys is a value of Vy obtained when the detection circuit 32 is applied with Vo'. Vys is expressed by the equation (14) below:

$$Vys = Vo' \times R24' \div (R23' + R24') \tag{14}$$

The charging operation is triggered by connecting the secondary battery 2 to the detection/charging unit 30. In Step S1, the FET Q21 is switched OFF, and the FET Q22 is turned ON, and in step S2, the voltages Vx, Vy are respectively measured at the charge control unit 40. The detection circuits 31 and 32 are isolated by turning the FET Q21 OFF, and thereby blocking the charge current Ib. Cutting off of the charge current Ib can exclude influence, for example, of ON resistance of the FET Q21. The no-load voltage Vo of the power source unit 1 is applied to the detection circuit 31. The open voltage of the secondary battery 2 is applied to the detection circuit 32 by turning the FET Q22 ON. In step S3, ΔVxy is determined by calculating (Vx−Vy).

In step S4, ΔVxy and the reference voltage ΔVp are compared as follow:

$$(\Delta Vxy = Vx - Vy) > \Delta Vp \tag{15}$$

If the voltage ΔVxy which indicates difference between the measured Vx and Vy is larger than the reference voltage ΔVp set at the charge control unit 40 as shown by the relational expression (15), the FET Q21 and the FET Q22 are turned ON in step S5, and the secondary battery 2 is charged with the charge current Ib. In step S6, in synchronization with the start of charging, a timer T1 of the charge control unit 40 starts counting. The timer T1 specifies intervals of the voltage measurement as, for example, 5 minutes.

In step S7, whether the count by the timer T1 reached the set value or not is judged. More specifically, whether a predetermined time has elapsed or not is judged. When the count by the timer T1 reached the set value, the process returns to step S1. In Step S1, the FET Q21 is switched OFF, to put the charge current Ib to OFF mode. In step S2, voltages Vx, Vy are respectively measured, ΔVxy is determined again, then in step S3, ΔVxy and the reference voltage ΔVp are compared. If ΔVxy>ΔVp, the charging operation is repeated again.

If ΔVxy is found to be not larger than the reference voltage ΔVp in step S4, it is judged that the error correction became possible. In this state, difference between the no-load voltage Vo of the power source unit 1 and the open voltage Vb of the secondary battery 2 has a value not larger than the forward voltage of the parasitic diode D22. In order to numerically express the error residing between the detection circuit 31 and the detection circuit 32, operations in step S8 and thereafter are carried out.

The FET Q21 is turned ON, and the FET Q22 is switched OFF in step S8, and Vx, Vy are respectively measured in step S9. Because ΔVp is set to be not larger than the forward voltage Vf of the parasitic diode D22 of the FET Q22, the parasitic diode D22 of the FET Q22 is not turned ON even when the FET Q21 is in the ON state, the charge current Ib does not flow in the secondary battery 2, and the detection circuit 31 and the detection circuit 32 are equally applied with the output voltage Vo of the power source unit 1.

Assuming the voltages Vx and Vy measured in step S9 as Vx' and Vy', respectively, (ΔVxy'=Vx'−Vy') is calculated in step S10. Since Vx'=Vy' should hold when the resistors R21 to R24 are set identical, ΔVxy' expresses the error which resides between the detection circuit 31 and the detection circuit 32.

The FET Q21 is switched OFF, and the FET Q22 is turned ON in step S11, and Vx, Vy are respectively measured in step S12, thereby calculating (ΔVxy=Vx×Vy). Since the FET Q21 is switched OFF, and the FET Q22 is turned ON, the detection circuit 31 is applied with the no-load voltage Vo of the power source unit 1, and the detection circuit 32 is applied with the open voltage Vb of the secondary battery 2. ΔVxy is therefore a voltage for judging whether the end-of-charge state is achieved or not. The error contained in the voltage is corrected. Assuming now that the corrected ΔVxy as ΔVxyq, ΔVxyq is determined in step S13, by calculation below:

$$\Delta Vxyq = \Delta Vxy - \Delta Vxy' \quad (16)$$

In step S14, whether the end-of-charge state is achieved or not is judged by using the voltage difference which is obtained after the error is corrected. More specifically, if ΔVxyq>ΔVq, the FET Q21 and the Q22 are turned ON in step S16, and the charging is started (maintained). A timer T2 of the charge control unit 40 starts counting in synchronization with the start of charging, and when the counting operation of the timer T2 is completed, or a predetermined time has elapsed, the process returns to step S11. Similarly to as described in the above, if ΔVxyq is judged as being not larger than the reference voltage ΔVq in step S14, the secondary battery 2 is judged as being fully charged, the FET Q21 and the Q22 are then switched OFF in step S15, and the charging comes to the end. It is also allowable, upon detection of the end-of-charge state, to alter display of LEDs or the like, and to terminate the charging after a predetermined length of time has elapsed.

Figure 5:
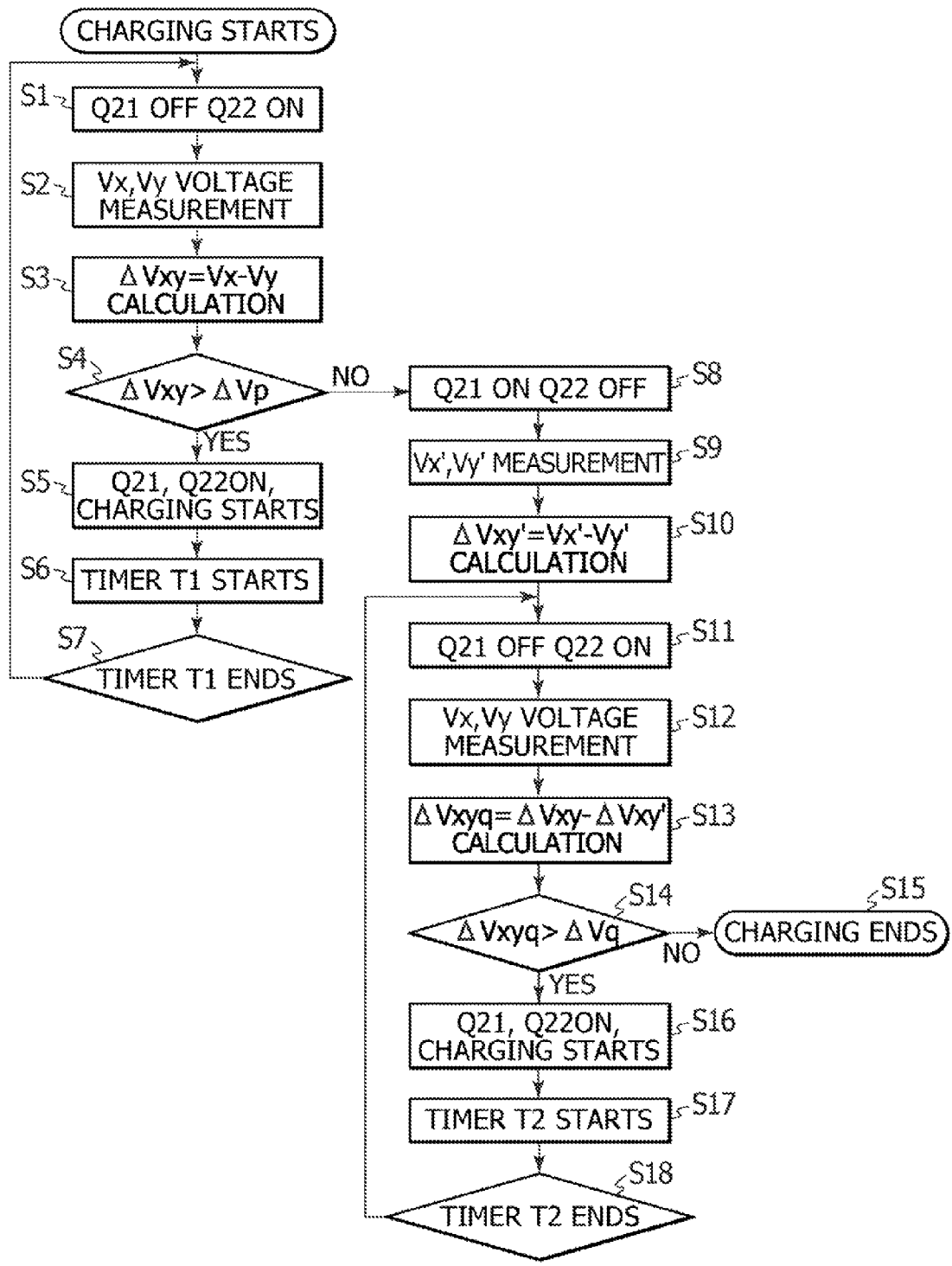
FIG. 5 is a flow chart showing a process flow in one embodiment.

The operations for correcting the resistor errors shown by the flow chart in FIG. 5 is preferably executed every time the charging operation is performed to correct errors made in the resistor value variable with environmental changes such as temperature, and with years. It is, however, also permissible to adopt a method of correcting the errors only at the time of manufacturing of the charger, and of storing corrected value ΔVxyq into a non-volatile memory.

Accuracy of the above-described ΔV detection according to one embodiment will be explained by referring to FIG. 6 and FIG. 7, presupposing R21=R22=R23=R24.

Figure 6:
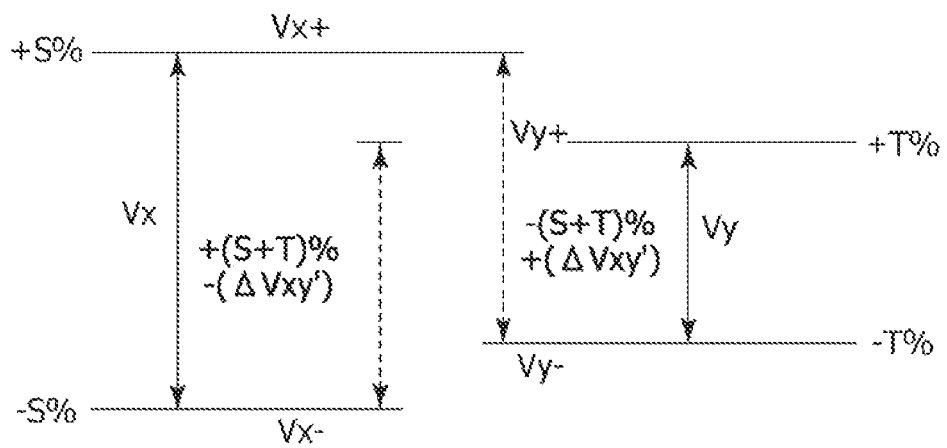
FIG. 6 is a schematic diagram schematically showing influences of resistor errors.

When the detection circuit 31 containing the resistors having an accuracy of ±S % is applied with voltage, detected voltage Vx is maximized to Vx+ and minimized to Vx− as shown in FIG. 6. Similarly, when the detection circuit 32 containing the resistors having an accuracy of T % is applied with voltage, detected voltage Vy is maximized to Vy+ and minimized to Vy−.

In the ΔV detection system, a value of Vy is detected on the basis of Vx. Therefore, an error contained in Vy− as viewed on the basis of Vx+ is maximized to approximately −(S+T) %, and an error contained in Vy+ as viewed on the basis of Vx− is maximized to approximately +(S+T) %. This is an error found among the detection circuits.

According to an embodiment, difference (ΔVxy' in FIG. 6) attributable to the accuracy of the resistor values can be expressed by numerals. As a consequence, the error found between the detection circuits attributable to the accuracy of the resistors can be reduced to 0% by correcting the difference ΔVxy' contained in Vy as viewed on the basis of Vx. In other words, now the difference between Vx and Vy may be perfectly correctable, whatever the potential of Vx as the reference would be. This means that the ratio of division of R21 and R22 in the detection circuit 31 and accuracy of the resistors are not affective at all to the detection accuracy.

Figure 7:
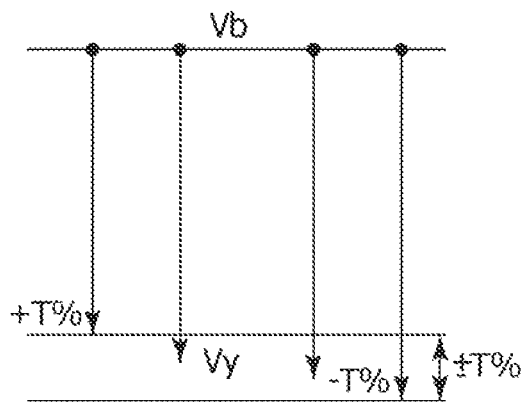
FIG. 7 is a schematic diagram schematically showing influences of resistor errors.

In addition, as shown in FIG. 7, values of Vy used for detecting required ΔV varies with a range of ±T %, due to accuracy of the resistors R23, R24. Since the reference value ΔVq used for detecting whether the end-of-charge state is achieved or not is determined by the center values R23' and R24' of the resistors R23 and R24 as expressed by the equation (13), the reference value ΔVq is affected by the errors in the resistors R23, R24. Therefore, for more accurate detection of ΔV, ΔVq set on the charge control unit 40 is preferably adjusted the accuracy of the resistors R23 and R24 within a range of ±T %.

Figure 8:
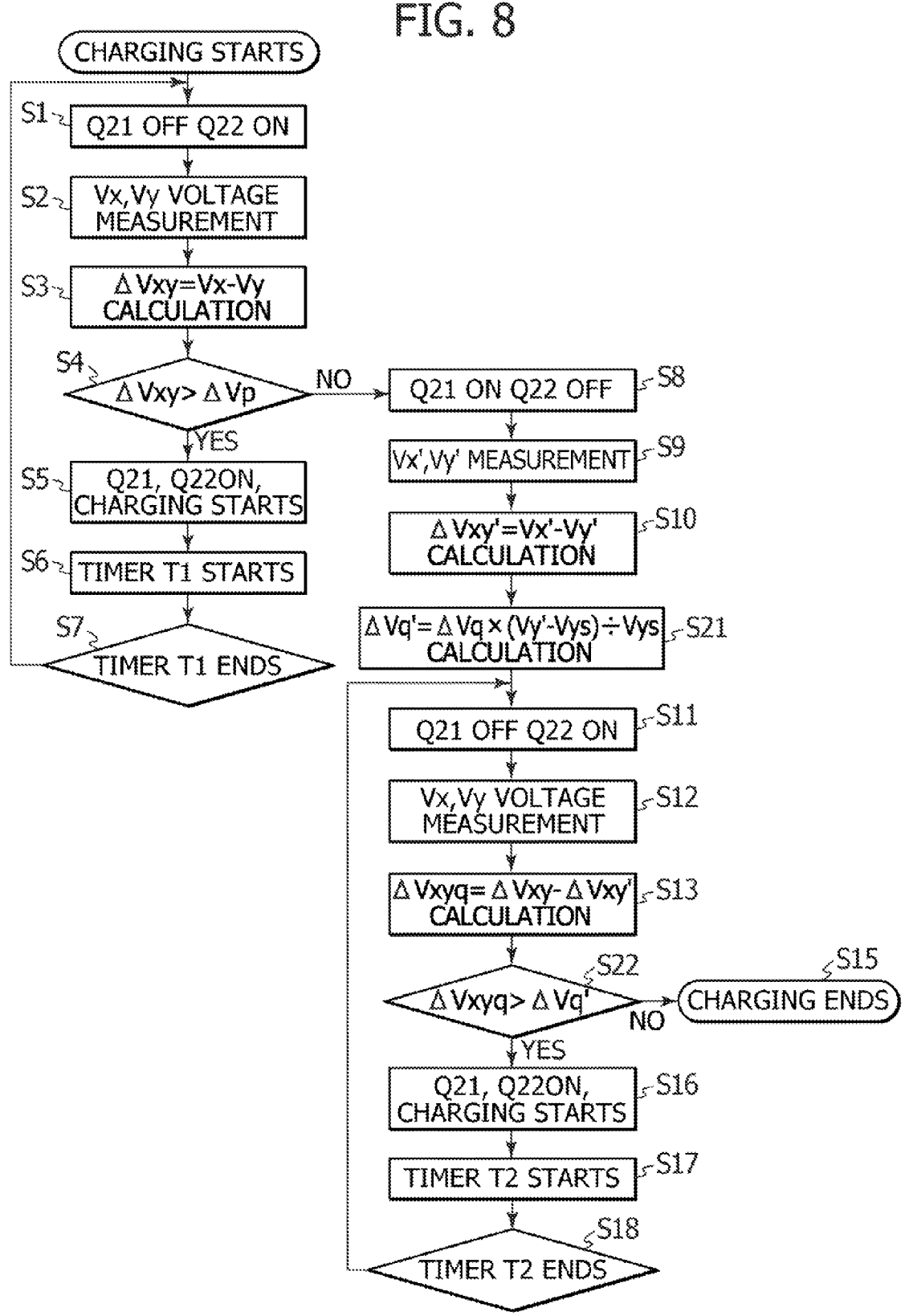
FIG. 8 is a flow chart showing a process flow in another embodiment.

The flow chart in FIG. 8 shows a correction process according to another embodiment, which enables both of correction of the error contained in the detected voltage in the above-described embodiment, and correction of an error in the reference voltage ΔVq. In step S10, the error ΔVxy' in the detected voltage is calculated, and next in step S21, the error in the reference voltage Vq is corrected.

Error in the detection circuit 32 ascribable to accuracy of the resistors can be found by Vy' and the reference value Vys preliminarily set on the charge control unit 40 (as expressed by the equation (14)). The error Q of the detection circuit 32 is expressed by the equation below:

$$Q = (Vy' - Vys) \div Vys \quad (17)$$

Values of ΔVq preliminarily set on the charge control unit 40 is determined by the center values of the resistors R23, R24 as described above, and ΔVq' whereto accuracy of the resistors R23 and R24 are additionally added is expressed by the equation below:

$$\Delta Vq' = \Delta Vq \times Q \quad (18)$$

In step S21, the reference value Vq' after being corrected is calculated by the equation (18). The FET Q21 is switched OFF and the FET Q22 is turned ON in step S11, voltages Vx, Vy are measured in step S12, and the voltage ΔVxyq in which the error is corrected is calculated in step S13. The voltage difference ΔVxyq after being corrected in the error and ΔVq' are compared in step S22 according to the relational expression (19), to judge whether the end-of-charge state is achieved or not.

$$(\Delta Vxyq = Vx - Vy - \Delta Vxy') > \Delta Vq' \quad (19)$$

If the relational expression (19) holds, the charging is re-started by turning the FET Q21 and the FET Q22 ON in step S16. The timer T2 of the charge control unit 40 starts counting in synchronization with the re-start of charging. If the count by the timer T2 reaches the set value, the process returns to step S11 to put the charge current Ib to OFF state by turning the FET Q21 OFF, and in step S12, Vx, Vy are measured and ΔVxyq is determined again, and in step S22, ΔVxyq and the reference voltage ΔVq' are compared. If the relational expression (19) does not hold, the end-of-charge state was judged as being achieved, both of the FETs Q21, Q22 are switched OFF, and the charging comes to the end (step S15). As has been described in the above, use of two values of ΔVxy' and ΔVq' in which errors are corrected, respectively, allows extremely precise ΔV detection.

In another embodiment, the error in the detection circuit 32 is expressed by numerals based on the value determined by the equation (17), and finished by the equation (18). By this correction, the ratio of division by the resistors R23, R24 in the detection circuit 32 and accuracy of the resistors can be made not to affect the detection accuracy.

Figure 9:
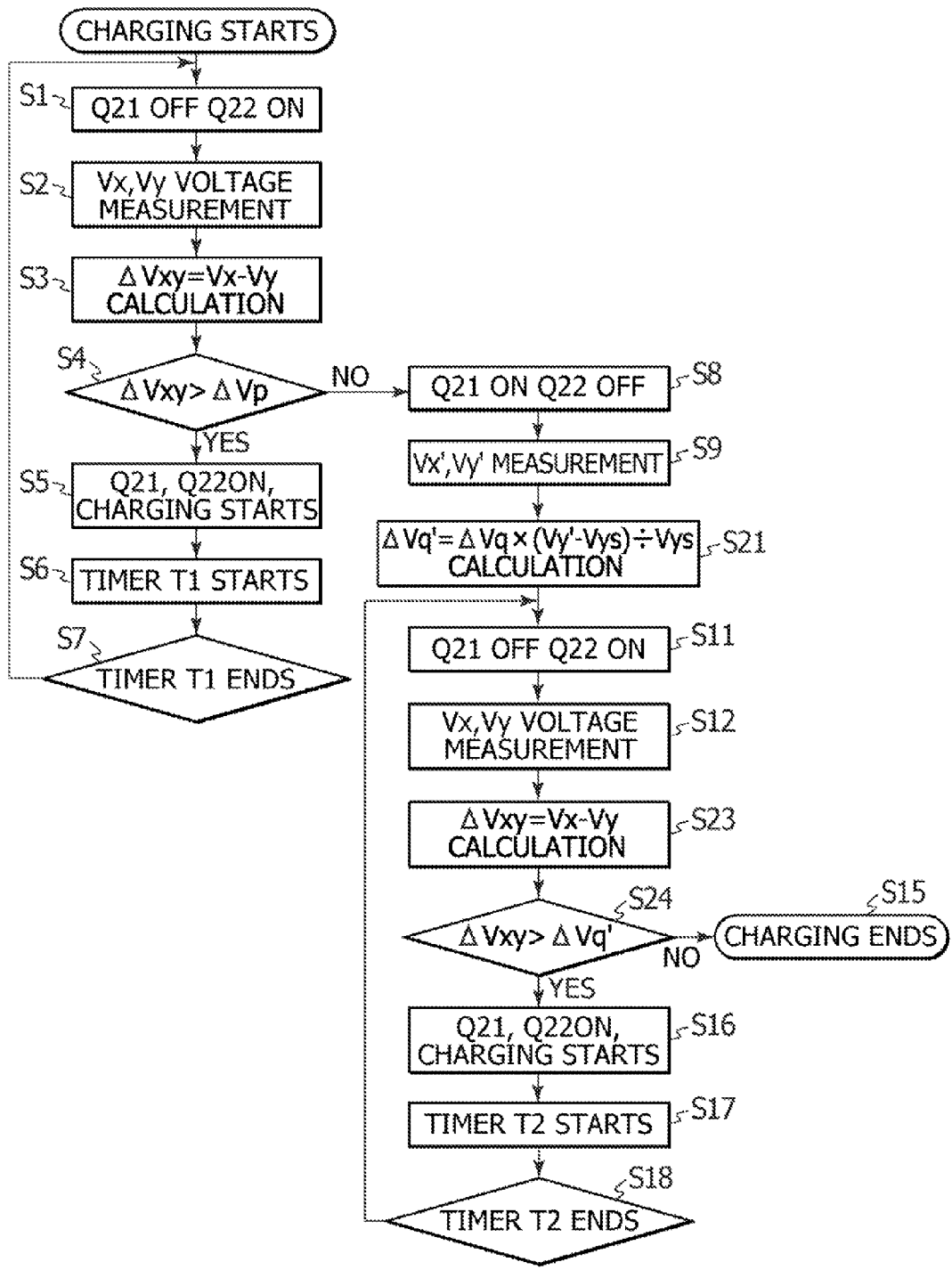
FIG. 9 is a flow chart showing a process flow in still another embodiment.

Alternatively, it is also allowable to correct only the reference voltage Vq, without correcting the detected voltage ΔVxy. FIG. 9 is a flow chart showing this sort of process according to still another embodiment. As similar with step S21 in the flow chart shown in FIG. 8, the error in the reference voltage Vq is corrected in step S21, and ΔVq' is calculated. ΔVxy(=Vx−Vy) is then calculated in step S23, ΔVxy and ΔVq' are compared in step S24, if ΔVxy>ΔVq', the charging is re-started, and if ΔVxy≦ΔVq', the charging is terminated. The error in the detected voltage ΔVxy is not corrected.

Last of all, errors ascribable to variation in adjustment of the no-load voltage Vo of the power source unit 1 will be explained. Typically, the voltage Vo is adjusted to Vo±U % by a variable resistor or the like. Adjustment of the voltage Vo well known in the art will not be explained here. The reference voltage Vys preliminarily set on the charge control unit 40 contains an error of ±U %, because Vo is set as rated value Vo'. As a consequence, also ΔVq' contains an error of ±U % due to an accuracy of adjustment of ±U % of voltage Vo, as can be understood from the equations (17) and (18).

Influence of the error exerted on the open voltage Vb of the secondary battery 2 can be expressed from the above-described equation (19) and the equation (20) below:

$$Vb = Vy \times (R23+R24) \div R24 \qquad (20)$$

From the equations (19) and (20), ratio of ΔVq' to Vy is understood as an influence of ΔVq' exerted to Vb. Assuming now (ΔVq'÷Vy×100) as W %, Vb will finally have an error of approximately ±(U/100×W/100)×100(%).

Transformation of the equation (19) gives:

$$\Delta Vq' / Vy \approx \Delta Vxy/Vy \approx \Delta V/Vo \qquad (21)$$

ΔV of the charger is generally smaller than 1% of the output voltage.

Assuming now that the accuracy of adjustment of the no-load voltage Vo of the power source unit 1 as 0.2%, accuracy of the voltage Vb observed when the charging is terminated by the charger according to an embodiment will be approximately ±0.002%, proving possibility of highly precise detection.

If the value of Vo' in the equation (14) is preliminarily measured, and entered in the charge control unit 40, it is possible to set the reference voltage Vys accurately.

In one embodiment (flow chart in FIG. 5), only the corrected value ΔVxy' is corrected without determining ΔVq'. In this case, an equation corresponding with the equation (19) is shown below:

$$(\Delta Vxyq = Vx - Vy - \Delta Vxy') > \Delta Vq \qquad (22)$$

Transformation of the expression (22) will give the relational expression (23) below, which is similar with the relational expression (21):

$$\Delta Vq/Vy \approx \Delta V/Vo \qquad (23)$$

ΔVq contains an error ascribable to an accuracy of T % of the resistors R23, R24 as is understood from the equation (20). If R23=R24, ΔVq will have an error of T %.

From the equations (20) and (23), the no-load voltage Vb of the power source unit 1 will have an error of approximately ±(T/100×W/100)×100(%). In this case, the detection error ascribable to the adjustment accuracy of the output voltage will not occur, but the errors ascribable to accuracy of the resistors in the detection circuit 32 and the ratio of division will occur.

Assuming now that the accuracy T of the resistors as ±0.5%, accuracy of the voltage Vb observed when the charging is terminated by the detection circuit of the present embodiment will be approximately ±0.005%, proving possibility of highly precise detection.

In the above-described embodiments, the operation moves to detection and correction of errors of the detection voltage when difference voltage Vxy between detected voltage Vx and Vy becomes equal or lower than the reference voltage Vp, while FETQ21 is turned OFF, and FETQ22 is turned ON. That is, when difference voltage ΔV between no-load voltage Vo of the power source unit 1 and open-circuit voltage Vb of the secondary battery becomes less than forward voltage Vf of parasitic diode D22, FETQ21 is turned ON and FETQ22 is turned OFF such that the operation moves to a correction operation. By the relation of (Vo−Vb)<Vf, the charge current Ib does not flow via the parasitic diode D22 of FETQ22.

Thus, by detecting non-flow of the charge current Ib, when FETQ21 is turned ON and FETQ 22 is turned OFF, the operation may move from charge operation to correction operation. At the embodiments 4 to 6 described below, the operation moves from charge operation to correction operation by assuming that non-flow of the charge current Ib is detected.

Figure 10:
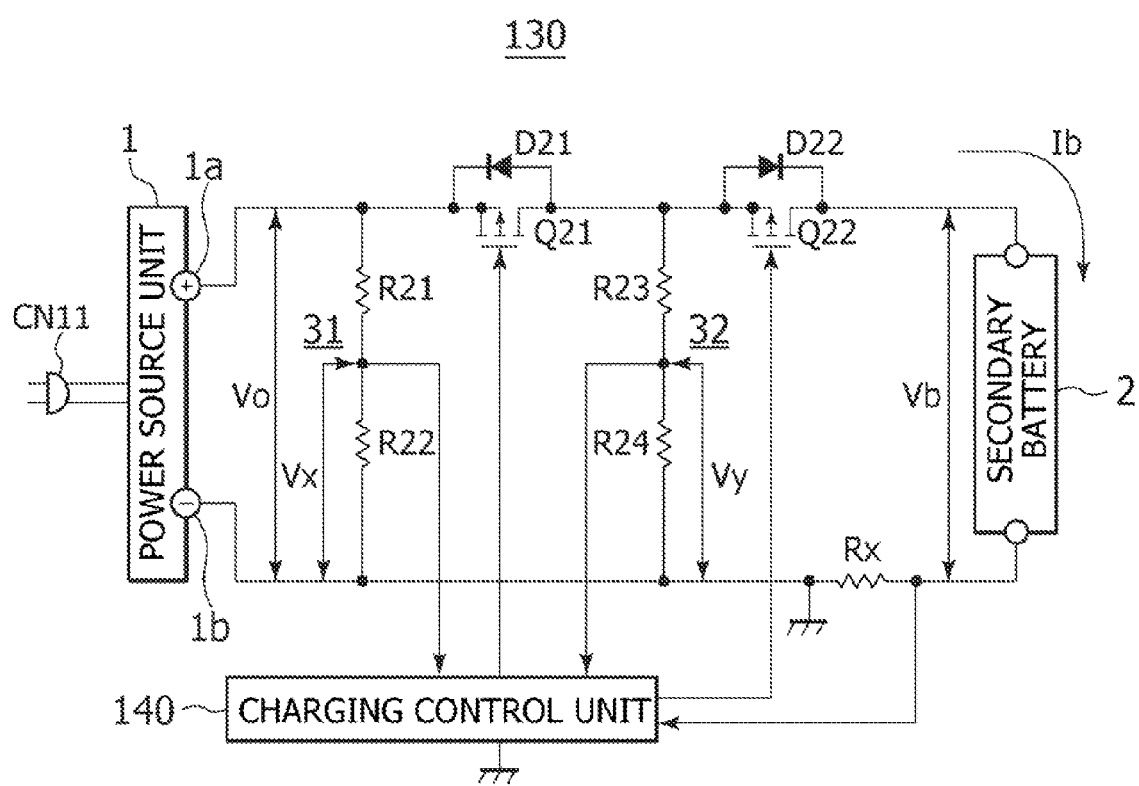
FIG. 10 is a connection diagram according to another embodiment.

Configuration of an embodiment is described in FIG. 10, and the configuration is same with that of the first embodiment described in FIG. 3. The power supply unit 1 is connected to a commercial power supply with AC connector CN11 in between, and the output voltage Vo (no-load voltage) is outputted to output terminals 1a and 1b by AC-DC conversion. The output voltage of the power supply unit 1 is supplied to the secondary battery 2, such as lithium-ion batteries, via a detection/charging unit 130 to charge the secondary battery 2. The charger includes a charge control unit 140 and the detection/charging unit 130 controlled by the same.

P channel type FETQ21 and Q22, or the like are connected in series in the positive side power source line to connect positive side output terminal 1a of the power supply unit 1 and a positive electrode of the secondary battery 2. The parasitic diode D21 and D22 are positioned between the drain and source of FETQ21 and Q22 respectively.

The charge control unit 140 takes a form of IC including a microcomputer, for example. Although not shown in figures, positive output voltage of the power supply unit 1, for example, is supplied to a regulator to be converted to a predetermined operation source voltage (typically, a voltage lower than the output voltage Vo of the power supply unit 1), and thereafter, the operation source voltage is supplied to the charge control unit 140. The charge control unit 140 controls charging and discharging of the second battery 2 by controlling ON/OFF of the FETQ21 and Q22. Thus by control of the charge control unit 140, overcharge, over discharge, and over current of the secondary battery 2 may be prevented.

In another embodiment, the charge state is judged by flow or non-flow of the charge current Ib. The charge state indicates the charged amounts of the secondary battery 2 connected to the detection/charging unit 130 comparative to the charge capacity. If Vf is larger than $\Delta V$, the charge current Ib does not flow. In a practical sense, small amounts of the charge current Ib flows due to the leak current, or the like, and description in this specification as, non-flow of the charge current Ib includes the above mentioned small amounts of flow relevant to leakage.

The resistor Rx is positioned in the charge current path to detect whether the charge current Ib flows or not. For example, one end of the resistor Rx is connected to the negative side of the secondary battery 2, and another end is connected to the negative side output terminal of the power supply unit 1. The voltage drop generated between the one end and another end (ground) of the resistor Rx is supplied to the charge control unit 140, and the unit judges the charge current Ib as not flowing when voltage drop of the resistor Rx is almost 0.

A series connection of the resistor R21 and R22 (a first detection circuit 31) is connected to the range between the positive side output terminal 1a of the power supply unit 1 and the FETQ21 (source). A series connection of the resistor R23 and the resistor R24 (the second detection circuit) is connected to the range between the FETQ21 (drain) and FETQ22 (source). The voltage Vx extracted from the middle point of the connection between the resistor R21 and R22, and the voltage Vy extracted from the middle point of the connection between the resistor R23 and R24 are supplied to the charge control unit 140.

By turning OFF the FETQ21, the flow of the charge current Ib is prevented and the full charged no-load voltage Vo is applied to the detection circuit 31. The open-circuit voltage Vb of the secondary battery 2 is applied to the detection circuit 32 by turning ON the FETQ22. The no-load voltage Vo and the open-circuit voltage Vb are respectively measured indirectly by Vx and Vy to obtain the difference voltage $\Delta V$. Due to the typical relation that $\Delta V$ is equal to the charged amounts, the charged amounts are estimated from the difference voltage $\Delta V$, and operations, such as stop of charging or change of charge display are controlled based on $\Delta V$.

As similar with the cases described above according to other embodiment, errors exist between the voltage Vx detected by the detection circuit 31 and the voltage Vy detected by the detection circuit 32, depending on accuracy or the resistors, R21, R22, R23, and R24. The errors are measured and corrected.

FETQ21 may be connected to positive side power source line, while FETQ22 is connected to the negative side power source line. N channel type FETQ22 which is turned ON by the gate voltage equal to or higher than predetermined values in relation to the source is employed. Further, it is possible to insert both of FETQ21 and Q22 to negative side power source line.

Operations will be described by referring to the flow chart of FIG. 11 according to an embodiment. Control operation shown in the flow chart is performed a micro computer in the charge control unit 140. Steps (S9 to S18) in the flowchart of FIG. 5 showing operations in the first embodiment, and steps in the forth embodiment using the same reference number correspond each other.

Prior to start charging, reference value $\Delta Vq$ and Vys are stored in the memory of microcomputer in the charge control unit 140. These reference values are set at the stage when values of, for example, the resistors R21 to R24 are determined, and stored in the memory of the charge control unit 140. $\Delta Vq$ is a reference value to judge whether the charge should be completed or not. The difference voltage $\Delta Vxy$ between the measured Vx and Vy is compared with the reference value $\Delta Vq$ to judge the charged state.

(Vo−Vb=$\Delta V$) indicates the end of charge state, and $\Delta Vxy$ (=Vx−Vy) at this point is equal to $\Delta Vq$. As one example, center values (or nominal values) of the resistor R23 and R24 are set as R23' and R24' respectively, and $\Delta Vq$ is set as the equation (13).

Vys is a value of Vy when center of resistor values of R23 and R24 are set as R23' and R24', rated value of no-load voltage Vo is set as Vo', and Vo' is applied to the detection circuit 32, and expressed by the equation (14).

First, the secondary battery 2 is connected to the detection/charging unit 130 to start the charge operation. At Step S101, FETQ21 is turned ON and FETQ is turned OFF, at step S102, the charge current Ib is measured, and at step S104, whether the charge current is Ib≈0 or not is judged. The judgment is made by comparing the charge current Ib with a predetermined threshold. As the threshold, 100 mA may be employed. In case (Vo−Vb) is less than Vf, (Vf: forward voltage drop Vf of the parasitic diode D22), it becomes (Ib≈0), and otherwise, the charge current Ib flows.

If it is judged as not (Ib≈0) in the step S104, in the following step of S105, FETQ21 and FETQ22 are turned ON to charge the secondary battery 2. At step S106, while charging is started, a timer T1 of the charge control unit 140 starts counting. Voltage measurement interval of the timer T1 is, for example, five minutes.

At step S107, whether the timer T1 reached the set value or not, that is, whether predetermined period of times have passed is judged. If the timer T1 reaches the set value, the processing returns to step S101. At step S101, the charge current Ib is turned OFF by turning OFF the FETQ21. The charge current Ib is measured at step S102, and at step S104, whether Ib≈0 or not is judged. If it is judged as not Ib≈0, charging operation is repeated again.

Judgment of Ib≈0 at the step S104 means judgment allowing correction of errors. At this stage, difference between no-load voltage Vo of the power supply unit 1 and the open-circuit voltage Vb of the secondary battery 2 is a value equal to or lower than that of forward voltage drop of parasitic diode D22. Operations at step S9 and of the following steps are performed to put errors between the detection circuit 31 and detection circuit 32 into numerical values.

Since FETQ21 is turned ON and FETQ22 is turned OFF at the step S101, the processing of step S8 according to a flowchart of FIG. 5 is not required. Since processing of step S9 and of the following steps are same with that in the first embodiment (a flowchart in FIG. 5), an outline of the processing will be explained.

In the step S9, Vx' and Vy' are measured respectively, and at the step S10, ($\Delta Vxy'$=Vx'−Vy') is calculated. Under the setting where the resistors R21 to R24 are equal, Vx' should be equal to Vy', and thus the $\Delta Vxy'$ is the difference between the detection circuit 31 and the detection circuit 32.

In the step S11, FETQ21 is turned OFF and FETQ is turned ON, and at the step S12, Vx and Vy are measured respectively to calculate ($\Delta Vxy$=Vx−Vy). If $\Delta Vxy$ is expressed as $\Delta Vxyq$ after the difference correction, $\Delta Vxyq$ is figured out by calculation of ($\Delta Vxy$−$\Delta Vxy'$) at the step S13.

If $\Delta Vxyq$ is larger than $\Delta Vq$ at the step S14, FETQ21 and Q22 are turned ON at the step S16 to start (continue) charging. The timer T2 of the charge control unit 140 starts counting in synchronization with start of charging, and when counting by the timer T2 is completed, that is, when a predetermined period of times passed, the processing returns to the step S11. If ΔVxyq is judged as equal to or less than the reference voltage ΔVq at the step S14, judgment is made as the secondary battery 2 is full charged, and thus FETQ21 and Q22 are turned OFF at the step S15 to stop charging. Even though end of the charge state is detected, the charging may be stopped after predetermined hours by changing display of LED, or the like.

Figure 11:
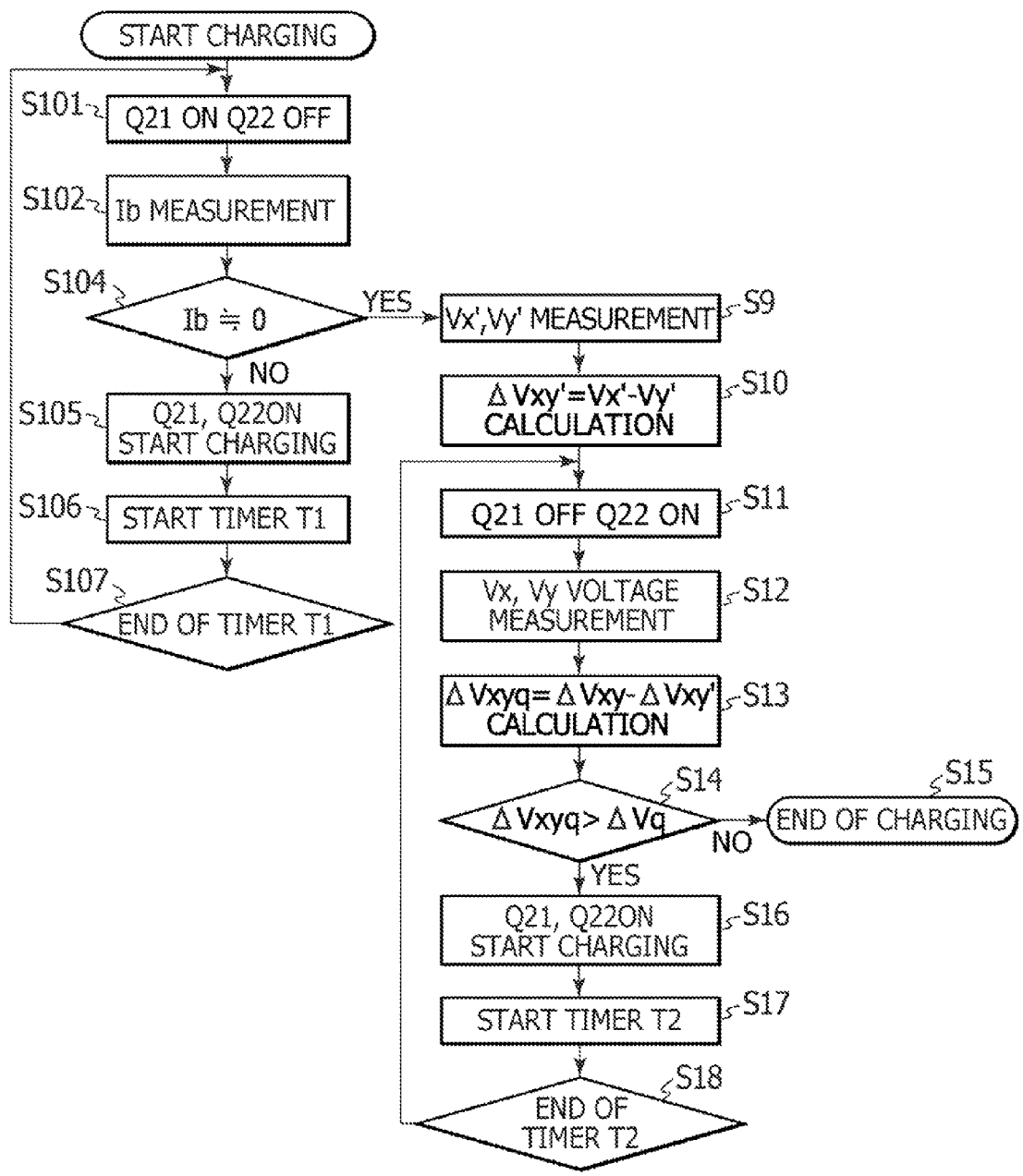
FIG. 11 is a flow chart showing a process flow according to another embodiment.

Corrections of resistor errors shown in a flowchart of FIG. 11 are preferably performed each time charge operation is performed, because errors of the resistor values varies depending of change of environmental conditions, such as temperature, and passage of years. However, it is also possible that difference correction is performed only when the charger is manufactured to store the corrected ΔVxyq in the nonvolatile memory.

As similar with an above-described embodiment, the difference ΔVxy' of the detection voltage is calculated, and the difference voltage ΔVxyq after correction of the error is calculated. The charging comes to the end when the difference voltage ΔVxyq becomes equal to or less than the reference value ΔVq.

Figure 12:
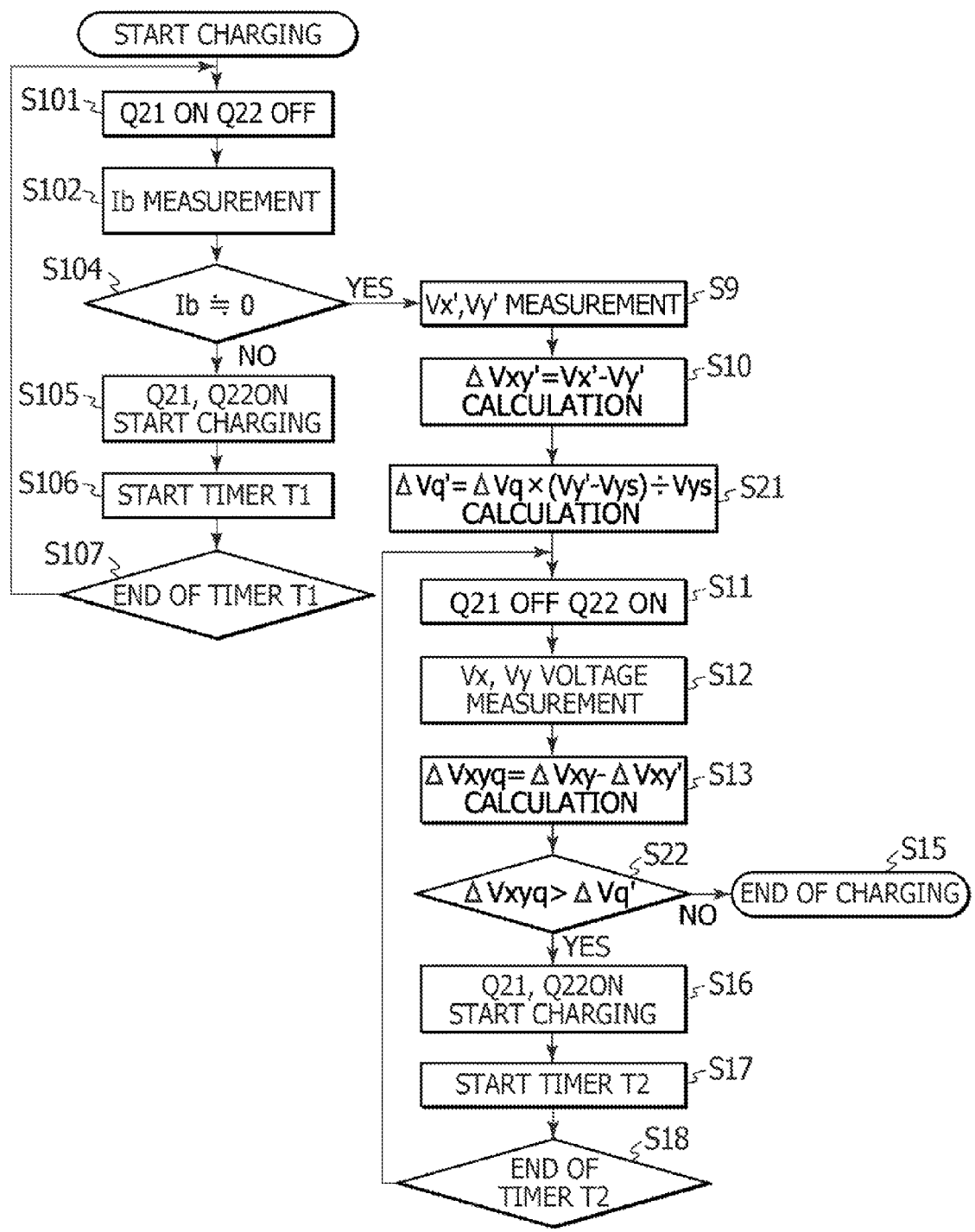
FIG. 12 is a flow chart showing a process flow according to another embodiment.

Next, another embodiment is described by referring to a flowchart of FIG. 12. In the fifth embodiment, as same with the case in the second embodiment, corrections of detection voltage errors and errors of reference voltage ΔVq are performed.

The step S101 (FETQ21 is ON, FETQ22 is OFF), the step S102 (measurement of the charge current Ib), the step S104 (judgment whether Ib≈0 or not), the step S105 (FETQ21 and FETQ22 are ON), the step S106 (start counting of timer T1), and the step S107 (end of timer T1) in the FIG. 12 are same with steps in the fourth embodiment.

Judgment of Ib≈0 in the step S104 means the judgment allowing correction of the errors. In this state, difference between the no-load voltage Vo of the power supply unit 1 and the open-circuit voltage Vb of the secondary battery 2 is values equal to or less than forward voltage drop of the parasitic diode D22. Processing of the step S9 and the steps following thereof are performed to correct errors of difference voltage positioned between the detection circuit 31 and the detection circuit 32, and to correct errors of the reference voltage.

Errors by resistance accuracy of the detection circuit 32 are made clear by the detection voltage Vy' and the reference value Vys (refer to the equation 14) set to the charge control unit 140 in advance. The error Q of the detection circuit 32 is expressed by the equation 17, that is, (Q=(Vy'−Vys)÷Vys).

Values of ΔVq set to the charge control unit 140 in advance are calculated by the center values of R23 and R24. The resistance accuracy of R23 and R24 is added to the values of ΔVq, and if ΔVq is set as ΔVq', ΔVq' is expressed by the equation 18, that is, ΔVq'=ΔVq×Q.

In the step S21, a value after correction, which is the reference value Vq' is calculated based on the equation 18. In the Step S11, FETQ21 is turned OFF and FETQ22 is turned ON, in the step S12, voltages of Vx and Vy are measured, and at the step S13, the voltage ΔVxyq whose errors are corrected is calculated, and at the step S22, whether the charging should be stopped or not is judged by comparing the difference voltage ΔVxyq whose errors are corrected and ΔVq', as shown in the equation 19, that is, (ΔVxyq=Vx−Vy−ΔVxy')>ΔVq'.

When the relation in the equation 19 is met, FETQ21 and FETQ22 are turned ON at the step S16 to resume charging. In conjunction with the start of charging, timer 2 of the charge control unit 140 starts counting. When the timer 2 reaches the set values, the processing returns to step S11, and the charge current Ib is turned OFF by turning OFF the FETQ21. Vx and Vy are measured at the step S12, and then Vxyq is calculated to be compared with the reference voltage ΔVq' at the step S22. If the relation in the equation 19 is not met, it is judged as end of charge state, and both of FETQ21 and Q22 are turned OFF to stop charging (step S15). By use of the thus corrected two values, ΔVxy' and ΔVq', highly accurate ΔV can be detected.

In an embodiment, errors of the detection circuit 32 are converted to numeric values by the equation 17, and correction of the errors is completed by the equation 18. By this correction, it is possible to prevent section ratio and resistance accuracy of the resistors R23 and R24 in the detection circuit 32 from affecting detection accuracy.

Figure 13:
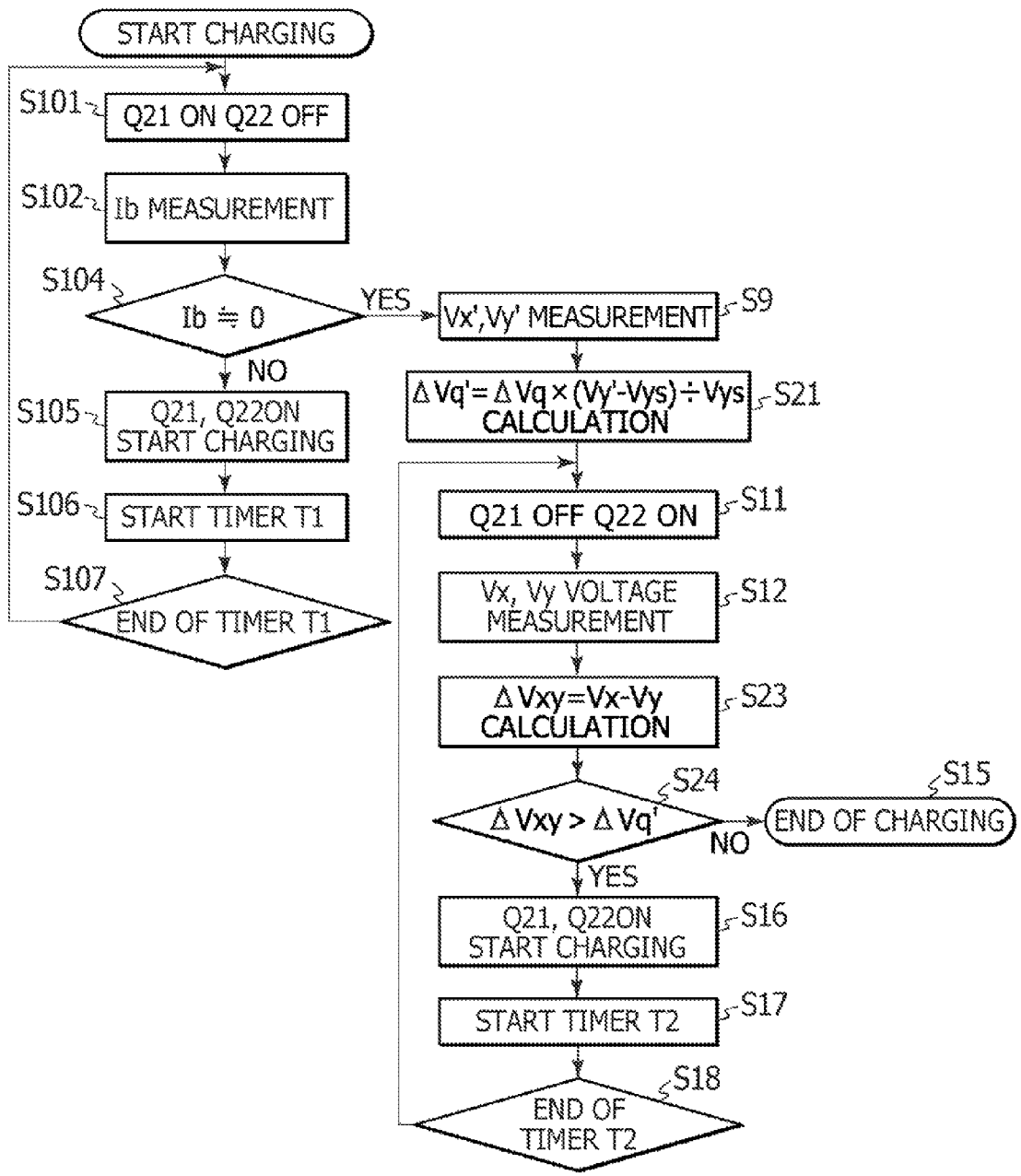
FIG. 13 is a flow chart showing a process flow according to another embodiment.

Next, an embodiment is described by referring to the flowchart of FIG. 13. As same with the case in the third embodiment, in the sixth embodiment, only the reference voltage Vq may be corrected instead of the detection voltage ΔVxy.

The following steps of FIG. 13 are same with those in the fourth and fifth embodiments: step S101 (FETQ21 is ON, and FETQ22 is OFF), step S102 (measurement of the charge current Ib), step S104 (judge whether Ib≈0 or not), step S105 (both FETQ21 and FETQ22 are ON), step S106 (start counting of timer T1), and step S107 (judge to end the timer T1).

At the step S21, errors of the reference voltage Vq is corrected, and ΔVq' is calculated, and at the step S23, ΔVxy (=Vx−Vy) is calculated. In the step S24, ΔVxy and ΔVq' are compared, and if ΔVxy is larger than ΔVq', charging is resumed, and if ΔVxy is equal to or less than ΔVq', the charging is stopped. Error correction of the detection voltage ΔVxy is not performed.

In the first to the third embodiments, FETQ21 is turned OFF and FETQ22 is turned ON, and when the difference voltage Vxy of the detected voltage Vx and Vy becomes equal to or less than the reference voltage Vp, the processing moves to detection and correction of the detection voltage errors. That is, if (Vo−Vb) is less than Vf, the processing moves to detection and correction of the errors. On the other hand, in the fourth to sixth embodiments, by detecting non-flow of the charge current Ib when FETQ21 is turned ON and FETQ22 is turned OFF, the processing moves from the charge operation to correction operation. Methods of detecting non-flow of the charge current Ib allows less effects caused by errors comparing to voltage detection methods.

Figure 14A:
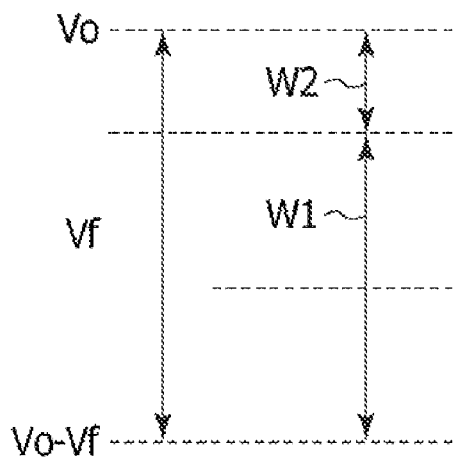
FIG. 14 is a schematic diagram for explaining methods for detecting currents when processing moves from charge operation to errors detection and error correction.

Referring to FIG. 14, FIG. 14A shows voltage detection methods. In the voltage range Vo to (Vo−Vf), the range W1 (Vo−Vb<Vf) is a detection range. Since the voltage is detected at the stage when errors of the detection circuit for detecting Vo and Vb are not yet corrected, the detection range W1 needs to be wide in view of errors effects. For example, judgment should be made by comparing (Vo−Vf) with 0.3V, which is less than Vf. On the other hand, ΔVq should be sufficiently smaller than Vf. If detection errors are increased and the detection range W1 becomes wide, there may be an effect that the detection range W2 of ΔVq becomes small.

Figure 14B:
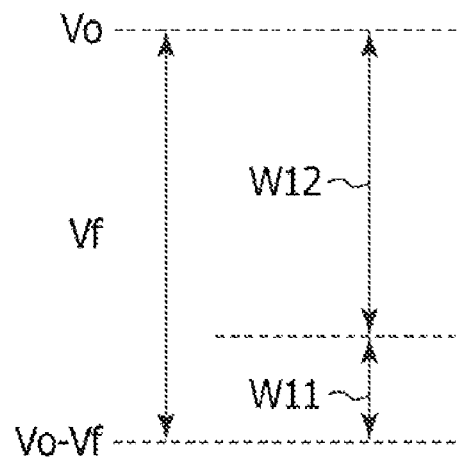

In the methods for detecting the current, judgment is focused on whether the charge current Ib flows or not without requiring high-precision components for the detection circuit, thus the detection range W11 may be small, as shown in FIG. 14B. Consequently, the detection range W12 of the reference voltage ΔVq may be kept wide. Therefore, it is not necessary to set ΔVq sufficiently smaller than Vf, and ΔVq may be set more freely.

The present application is not limited to the above-described embodiments, allowing various modifications based on the technical spirit thereof For example, although the charger described above includes the power source unit 1, the detection/charging unit 30 and the charge control unit 40, and the secondary battery 2 is connected to the charger, it is also allowable that the charger having the detection/charging unit 30 and the charge control unit 40 is integrated with the secondary battery 2. It is still also allowable to place the charger in a main unit of an electronic instrument.

Effects and operations according to an embodiment will be enumerated below:

1. $\Delta V$ can be detected at low costs in a highly precise accuracy without adding any special circuits or components, because, in the $\Delta V$ detection circuit, errors are corrected by controlling the field effect type transistors for regulating charging and discharging;

2. lowering of the charge capacity and degradation of batteries caused by recharging may be suppressed, because the secondary battery after completion of charging will not cause discharging due to the resistors (R23, R24) for detecting the open-circuit voltage Vb;

3. an IC composing the charge control unit is improved in the reliability without needing protection, because battery voltage of the secondary battery and the charge control unit are completely isolated on the voltage basis after completion of charging;

4. the costs can be reduced, because is it not necessary to use highly precise components as the resistors for detecting voltage;

5. correction available at every time of charging allows highly precise detection, less susceptible to environmental changes such as ambient temperature; and 6. reliability of the charge control unit can be improved, because ratios of resistive division (Vx/Vo, Vy/Vb) of the detection voltages Vx, Vy respectively to the output voltage Vo of the power source unit and to the open-circuit voltage Vb of the battery do not affect the detection accuracy, and thereby the ratio of division can be reduced.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A charger comprising:
input terminals whereto positive and negative voltages from a power source unit are applied;
output terminals generating an output for charging a secondary battery, upon being applied with the voltage from the input terminals via positive and negative power source lines;
a first field effect type transistor having a region between a drain and a source inserted and connected in at least one of the positive and negative power source lines, and having a first parasitic diode with the reverse polarity with respect to a charge current;
a second field effect type transistor having a drain and a source inserted and connected in at least one of the positive and negative power source lines, and having a second parasitic diode with a forward polarity with respect to the charge current;
a first detection circuit having series connections of a plurality of resistors inserted between the positive and negative power source lines, between the input terminals and the first field effect type transistor, and allowing extraction of a first detection voltage from a divisional point of the resistors;
a second detection circuit having series connections of a plurality of resistors inserted between the positive and negative power source lines, between the first field effect type transistor and the second field effect type transistor, and allowing extraction of a second detection voltage from a divisional point of the resistors; and
a charge control unit which is supplied with the first and second detection voltages, and generates ON/OFF control signals for gates of the first and second field effect transistors;
wherein the charge control unit calculates a first difference voltage between the first and second detection voltages, while turning the first field effect type transistor OFF and turning the second field effect type transistor ON, and judges whether the first difference voltage has a value not turning the second parasitic diode ON;
if the first difference voltage is judged as having a value turning the second parasitic diode ON, the first and second field effect type transistors are turned ON to perform a charging operation;
whereas, if the first difference voltage is judged as having a value not turning the second parasitic diode ON, the first field effect type transistor is turned ON and the second field effect type transistor is switched OFF to calculate a second difference voltage while applying a same voltage to the first and second detection circuits; and
the end-of-charge state is detected by comparing a third difference voltage with a reference voltage, the third voltage being corrected by the second difference voltage.

2. The charger according to claim 1, wherein:
the third difference voltage is obtained by correcting the difference voltage between the first and second detection voltages with the second difference voltage, while turning the first field effect type transistor OFF and turning the second field effect type transistor ON.

3. A charger comprising:
input terminals whereto positive and negative voltages from a power source unit are applied;
output terminals generating an output charging a secondary battery, upon being applied with the voltage from the input terminals with positive and negative power source lines in between;
a first field effect type transistor having a region between a drain and a source inserted in at least one of the positive and negative power source lines, and having a first parasitic diode having the reverse polarity with respect to charge current;
a second field effect type transistor having a region between a drain and a source inserted in at least one of the positive and negative power source lines, and having a second parasitic diode having a forward polarity with respect to charge current;
a first detection circuit having series connections of a plurality of resistors inserted between the positive and negative power source lines, between the input terminal and the first field effect transistor, allowing extraction of a first detection voltage from a divisional point of the resistors;
a second detection circuit having series connections of a plurality of resistors inserted between the positive and negative power source lines, between the first field effect type transistor and the second field effect type transistor, allowing extraction of a second detection voltage from a divisional point of the resistors; and a charge control unit which is supplied with the first and second detection voltages, and generates ON/OFF control signals for the gates of the first and second field effect type transistors;

wherein the charge control unit calculates a first difference voltage between the first and second detection voltages, while turning the first field effect type transistor OFF and turning the second field effect type transistor ON, and judges whether the first difference voltage has a value not turning the second parasitic diode ON;

if the first difference voltage is judged as having a value turning the second parasitic diode ON, the first and second field effect transistors are turned ON to perform a charging operation;

whereas, if the first difference voltage is judged as having a value not turning the second parasitic diode ON, calculation is performed on a corrected reference value in which error in the reference value for judging whether the end-of-charge state is achieved or not is corrected; and the end-of-charge state is detected by comparing the difference voltage between the first and second detection voltages with the corrected reference voltage.

4. The charger according to claim 3, wherein:

whether the end-of-charge state is achieved or not is judged by comparing the difference voltage between the first and second detection voltages with the corrected reference voltage, while the first field effect type transistor is switched OFF, and the second field effect type transistor is turned ON.

5. A method of charging comprising:

detecting first detection voltage by applying a no-load voltage from a power source unit to a first detection circuit while turning a first field effect type transistor OFF to cut off charge current, and detecting a second detection voltage by applying an open voltage of a secondary battery on a second detection circuit while turning a second field effect type transistor ON, calculating a first difference voltage between the first and second detection voltages, and judging whether the first difference voltage has a value not turning a second parasitic diode of the second field effect type transistor ON or not;

turning the first and second field effect type transistors ON to perform a charging operation, if the first difference voltage is judged as having a value turning the second parasitic diode ON;

turning the first field effect type transistor ON and turning the second field effect type transistor OFF while applying a same voltage to the first and second detection circuits to calculate a second difference voltage, if the first difference voltage is judged as having a value not turning the second parasitic diode ON; and comparing a third difference voltage corrected by thus-detected second difference voltage with a reference voltage, to detect the end-of-charge state.

6. The method according to claim 5, wherein:

the third difference voltage is obtained by correcting the difference voltage between the first and second detection voltages using the second difference voltage, while turning the first field effect type transistor OFF and turning the second field effect type transistor ON.

7. A method of charging comprising:

detecting first detection voltage by applying a no-load voltage from a power source unit to a first detection circuit to cut off charge current while turning a first field effect type transistor OFF, and detecting a second detection voltage by applying an open voltage of a secondary battery on a second detection circuit while turning a second field effect type transistor ON, calculating a first difference voltage between the first and second detection voltages, and judging whether the first difference voltage has a value not turning the second parasitic diode ON;

turning the first and second field effect type transistors ON and performing a charging operation, if the first difference voltage is judged as having a value turning the second parasitic diode ON;

performing calculation on a corrected reference value in which error in the reference value for judging whether the end-of-charge state is achieved or not is corrected, if the first difference voltage is judged as having a value not turning the second parasitic diode ON; and comparing the difference voltage between the first and second detection voltages with the corrected reference voltage, to detect the end-of-charge state.

8. The method of charging according to claim 7, wherein:

whether the end-of-charge state is achieved or not is judged, by comparing the difference voltage between the first and second detection voltages with the corrected reference voltage, while the first field effect type transistor is switched OFF, and the second field effect type transistor is turned ON.

9. A charger comprising:

input terminals whereto positive and negative voltages from a power source unit are applied;

output terminals generating an output for charging a secondary battery, upon being applied with the voltage from the input terminals via positive and negative power source lines;

a first field effect type transistor having a region between a drain and a source inserted and connected in at least one of the positive and negative power source lines, and having a first parasitic diode with a reverse polarity with respect to a charge current;

a second field effect type transistor having a region between a drain and a source inserted and connected in at least one of the positive and negative power source lines, and having a second parasitic diode with a forward polarity with respect to the charge current;

a first detection circuit including a plurality of series-connected resistors inserted between the positive and negative power source lines, between the input terminals and the first field effect type transistor, and allowing extraction of a first detection voltage from a divisional point of the resistors;

a second detection circuit including a plurality of series-connected resistors inserted between the positive and negative power source lines, between the first field effect type transistor and the second field effect type transistor, and allowing extraction of a second detection voltage from a divisional point of the resistors; and a charge control unit which is supplied with the first and second detection voltages, and generates an ON/OFF control signal for gates of the first and second field effect transistors;

wherein the charge control unit judges whether the charge current flows or not, while turning the first field effect type transistor ON and turning the second field effect type transistor OFF, and if the charge current is judge as flowing, charge operation is performed by turning ON both the first and second field effect type transistor;

if the charge current is judged as not flowing, a second difference voltage is calculated while a voltage is applied to the first and second detection circuits via the ON state first field effect type transistor; and the end-of-charge state is detected by comparing a third difference voltage, the third difference voltage being corrected by a detected second difference voltage with a reference voltage.

10. The charger according to claim 9, wherein:

the third difference voltage is obtained by correcting a difference voltage between the first and the second detection voltage with the second difference voltage, while the first field effect type transistor is turned OFF and the second field effect type transistor is turned ON.

11. A charger comprising:

input terminals whereto positive and negative voltages from a power source unit are applied;

output terminals generating an output for charging a secondary battery, upon being applied with the voltage from the input terminals via positive and negative power source lines;

a first field effect type transistor having a region between a drain and a source inserted and connected in at least one of the positive and negative power source lines, and having a first parasitic diode with the reverse polarity with respect to a charge current;

a second field effect type transistor having a region between a drain and a source inserted and connected in at least one of the positive and negative power source lines, and having a second parasitic diode with a forward polarity with respect to the charge current;

a first detection circuit having series connections of a plurality of resistors inserted between the positive and negative power source lines, between the input terminals and the first field effect type transistor, and allowing extraction of a first detection voltage from a divisional point of the resistors;

a second detection circuit having series connections of a plurality of resistors inserted between the positive and negative power source lines, between the first field effect type transistor and the second field effect type transistor, and allowing extraction of a second detection voltage from a divisional point of the resistors; and a charge control unit which is supplied with the first and second detection voltages, and generates ON/OFF control signals for gates of the first and second field effect transistors;

wherein the charge control unit judges whether the charge current flows or not, while turning the first field effect type transistor ON and turning the second field effect type transistor OFF, and performs charge operation by turning ON both the first and second field effect type transistor, if the charge current is judged as flowing;

if the charge current is judged as not flowing, a corrected reference value, which is a corrected error value of a reference value for judging whether end of charge state or not is calculated; and the end-of-charge state is detected by comparing a difference voltage between the first and the second detection voltage with a corrected reference voltage.

12. The charger according to claim 11, wherein:

whether the end of charge state or not is judged by comparing the difference voltage between the first and the second detection voltage with the corrected reference voltage while turning OFF the first field effect type transistor and turning ON the second field effect type transistor.

13. A method of charging a charger in which:

a secondary battery is charged via a first and a second field effect type transistor connected in series, a voltage at input side of the first field effect type transistor is detected by a first detection circuit including a plurality of resistors, and a voltage at connection point between the first field effect type transistor and the second field effect type transistor is detected by a second detection circuit including a plurality of resistors;

the method of charging comprising:

judging whether a charge current flows to a secondary battery via a parasitic diode of the second field effect type transistor while turning the first field effect type transistor ON and turning the second field effect type transistor OFF, performing charging operation to the secondary battery by turning ON both of the first and the second field effect type transistors, when the charge current is judged as flowing;

calculating a difference voltage while a voltage equal to that of the first and the second detection circuits is applied, via the ON state first field effect type transistor when the charge current is judged as not flowing; and detecting end of the charge state by comparing a difference voltage corrected by the above difference voltage with a reference voltage.

14. The method of charging according to claim 13 wherein:

the corrected difference voltage is obtained by correcting a difference voltage between the first and the second detection voltage by the difference voltage, while the first field effect type transistor is turned OFF and the second field effect type transistor is turned ON.

15. A method of charging a charger in which:

a secondary battery is charged via a first and a second field effect type transistor connected in series, a voltage at input side of the first field effect type transistor is detected by a first detection circuit including a plurality of resistors, and a voltage at connection point between the first field effect type transistor and the second field effect type transistor is detected by a second detection circuit including a plurality of resistors;

the method of charging comprising:

judging whether a charge current flows to the secondary battery via a parasitic diode of the second field effect type transistor while turning the first field effect type transistor ON and turning the second field effect type transistor OFF, performing charging operation to the secondary battery by turning ON both of the first and the second field effect type transistors, when the charge current is judged as flowing;

calculating a corrected reference value, which is a corrected error value of the reference value for judging end of the charge state, when the charge current is judged as not flowing; and detecting end of the charge state by comparing a difference voltage between the first and the second detection circuits with the corrected reference voltage.

16. The method of charging according to claim 15 wherein:

whether the end of the charge state or not is judged by comparing the difference voltage between the first and the second detection voltage with the corrected reference voltage, while the first field effect type transistor is turned OFF and the second field effect type transistor is turned ON.

* * * * *